(12) United States Patent
Kumagai

(10) Patent No.: US 6,449,226 B1
(45) Date of Patent: Sep. 10, 2002

(54) RECORDING AND PLAYBACK APPARATUS AND METHOD, TERMINAL DEVICE, TRANSMITTING/RECEIVING METHOD, AND STORAGE MEDIUM

(75) Inventor: Takashi Kumagai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/689,425

(22) Filed: Oct. 12, 2000

(30) Foreign Application Priority Data

Oct. 13, 1999 (JP) .......................................... 11-290864

(51) Int. Cl.[7] ................................................. G11B 7/00
(52) U.S. Cl. ..................... 369/47.1; 369/47.12; 369/84; 369/59.1
(58) Field of Search ............................ 369/47.1, 47.11, 369/47.12, 47.16, 47.22, 47.32, 53.1, 53.11, 53.2, 53.15, 53.41, 53.44, 59.1, 84, 85

(56) References Cited

U.S. PATENT DOCUMENTS 5,418,767 A * 5/1995 Gaudet et al. ............ 369/53.16

FOREIGN PATENT DOCUMENTS

GB    2276971    10/1994
WO    9318465    9/1993

* cited by examiner

Primary Examiner—Muhammad Edun
(74) Attorney, Agent, or Firm—Jay H. Maioli

(57) ABSTRACT

A method and apparatus to enable a user to easily make a search with respect to a large amount of music data copied and stored from CDs in a built-in recording medium. A music server is able to record a large amount of music data played back from CDs in a built-in hard disk drive (HDD). When recording the music data, table of contents (TOC) information of each CD is read out of the CD and recorded in the HDD, and simultaneously sent to a personal computer via a connecting line. A CD album information database is provided in the form of a CD-ROM to the personal computer. In the personal computer, which one of CDs recorded in the database on the CD-ROM corresponds to the relevant CD is searched based on the total playing time and the time information of each track which are contained in the TOC information sent to the personal computer. A search result is sent back to the music server. The music server records the CD album information in the HDD in the form of a management database in correlation to the TOC information so that the CD album information can be displayed or a music CD to be played back can be selected based on the CD album information.

24 Claims, 14 Drawing Sheets

FIG. 12

|   | TOTAL PLAYING TIME | NUMBER OF TRACKS | TIME OF EACH TRACK | | |
|---|---|---|---|---|---|
|   |   |   | 1TR | 2TR | 3TR |
| 1 | xx:xx:xx | 10 | xx:xx:xx | xx:xx:xx | xx:xx:xx |
| 2 | xx:xx:xx | 12 | xx:xx:xx | xx:xx:xx | xx:xx:xx |
| ⋮ | ⋮ | ⋮ | ⋮ | ⋮ | ⋮ |

FIG. 13

| ADDRESS INFORMATION | FILE NO. |
|---|---|
| 00xx ~ 01xx | 001 |
| 02xx ~ 05xx | 002 |
| 06xx ~ 08xx | 003 |
| 09xx ~ 10xx | 004 |
| ⋮ | ⋮ |

FIG. 14

| NAME OF PLAYER | TITLE OF ALBUM | TOTAL NUMBER OF TRACKS | TIME OF EACH TRACK | | TITLE OF EACH TRACK | | JACKET IMAGE |
|---|---|---|---|---|---|---|---|
| | | | 1TR | 2TR | 1TR | 2TR | |
| AAAA | EEEE | 8 | xx:xx:xx | xx:xx:xx | III | MMM | xxxx |
| BBBB | FFFF | 10 | xx:xx:xx | xx:xx:xx | JJJ | NNN | xxxx |
| CCCC | GGGG | 9 | xx:xx:xx | xx:xx:xx | KKK | OOO | xxxx |
| DDDD | HHHH | 12 | xx:xx:xx | xx:xx:xx | LLL | PPP | xxxx |

| DATE OF RECORDING | BILL | CORRELATION ||
| | | CD ALBUM INFORMATION | FILE MANAGEMENT TABLE |
| --- | --- | --- | --- |
| 1999.12.01 xx:xx:xx | BILLED | xxxx | xxxx |
| 1999.12.10R xx:xx:xx | BILLED | xxxx | xxxx |
| 1999.12.15 xx:xx:xx | BILLING | xxxx | xxxx |
| ⋮ | ⋮ | ⋮ | ⋮ |

RECORDING AND PLAYBACK APPARATUS AND METHOD, TERMINAL DEVICE, TRANSMITTING/RECEIVING METHOD, AND STORAGE MEDIUM

BACKGROUND OF THE INVENTION

1. Field of the Invention

The present invention relates to a recording and playback apparatus and method, a terminal device, a transmitting/receiving method, as well as a storage medium, which enable the user to easily make a search with respect to a large amount of music data stored in or recorded on a storage or recording medium incorporated in the apparatus.

2. Description of the Related Art

In the past, the so-called CD changer containing many CDs (Compact Discs) and automatically playing back audio data recorded on the CDs was practiced. In such a CD changer, several tens to several hundreds pieces of CDs are contained in one housing, and one of the CDs is selected with a predetermined operation for automatic playback. Audio data recorded on CDs can be played back orderly for each of the CDs, or at random in units of CD or a piece of music recorded on each CD by selecting a plurality of CDs. That type of CD changer is mostly employed in stationary fashion, i.e., by being fixedly installed in a room.

However, the above-described CD changer had a difficulty in realizing continuous playback because a CD exchange time is required even in the automatic playback mode. Also, a CD changer containing 100, 200 or more pieces of CDs is very inconvenient to carry and install in place because of an increased size and weight of the housing.

To overcome those problems, instead of the CD changer, there has been proposed an audio server employing a recording medium, such as a hard disk drive, which is relatively small in size, but has a large storage capacity. In the audio server, audio data recorded on each CD is read, and the read audio data is coded and compressed by a predetermined method. The compressed data is recorded and stored in the hard disk drive. By using a hard disk drive having a storage capacity on the order of 6 GByte, data of about 1000 pieces of music can be recorded. The audio server is superior to the above-described CD changer in that continuous playback can be easily realized because there is no necessity of exchanging CDs from one to another unlike the CD changer, and that the housing size can be reduced because a larger number of music data can be recorded in one unit of hard disk drive.

As mentioned above, an audio server can store a large amount of audio data. It is therefore necessary to input and store some data for search so that the user can find desired data from among the audio data stored in the audio server. The data for searching may include, for example, the titles of CDs and the titles of musical compositions (songs, etc.).

When the user enters or designates the title of a desired musical composition, for example, in the audio server, corresponding audio data is searched for based on the title of the musical composition and the found audio data is played back.

However, a CD does not generally record information attendant on the CD thereon, such as the name of player (singer), the title of music composition (song), and the title of the CD. Accordingly, a problem has been experienced in that when the user records and stores audio data recorded on a CD into an audio server, the user has to enter the information attendant on the CD into the audio server by himself or herself.

For example, the user has to enter the attendant information in the audio server by manually key-inputting text data or by taking in a jacket image of the CD with an image scanner or the like. Particularly, in the case of recording and storing audio data of many CDs at a time, the problem is more serious because it is very troublesome to enter the attendant information for all the CDs.

On the other hand, a record area called TOC (Table Of Contents) is provided in a CD, and information regarding the playing time of each set of audio data on the CD is recorded in the TOC. Also, it is known that the CD title can be identified based on the TOC information. In view of the above, one would conceive a system for providing information to the audio server by constructing a database that includes the TOC information and the CD title information in a correspondent way.

The following two methods, for example, are potentially possible to realize such a system. According to the first method, the database is constructed in a server on a network, e.g., the Internet, and the audio server is connected to the Internet via the public telephone line or the like. Then, when audio data recorded on a CD is recorded and stored in the audio server, the database on the Internet is searched based on the TOC information of the CD to obtain the CD title information via the Internet. According to the second method, the database is constructed in a storage or recording medium of the audio server, and the CD title information is obtained from the database in the audio server.

However, the above first method has accompanied the problems that maintenance, management, etc. of the server installed on the Internet takes a substantial cost and an interface to the Internet, such as a modem, must be provided on the audio server side as well. In addition, since the audio server is connected via the Internet to the server in which the database is constructed, the charge of line use for connection to the Internet is increased.

Also, the above second method has accompanied the problem that since the database is constructed in a recording system incorporated in the audio server, an attempt to equip the database with a wider variety of information would need a very large storage capacity and would occupy a substantial space of the storage or recording medium.

Further, because new CDs are released regularly, the contents of the database are required to be updated successively. The update of the contents of the database is performed by utilizing the Internet in accordance with the first method, and the above-described problems occur.

SUMMARY OF THE INVENTION

An object of the present invention is therefore to provide a recording and playback apparatus and method, a terminal device, a transmitting/receiving method, as well as a storage medium for enabling the user to easily make a search with respect to a large amount of audio data which is recorded on and read out of CDs and then stored in a storage or recording medium incorporated in the apparatus.

To achieve the above object, according to a first aspect of the present invention, there is provided a recording and playback apparatus comprising a first playback unit for playing back a first storage medium; a second playback unit for playing back a second storage medium; a first reading unit for reading identification information of data stored in the first storage medium; a second reading unit for reading, based on the identification information, additional information stored in the second storage medium and corresponding to the identification information; and a storage unit for storing the additional information in correlation to the data or the identification information.

According to a second aspect of the present invention, there is provided a recording and playback apparatus comprising a first playback unit for playing back a first storage medium; a first reading unit for reading identification information of data stored in the first storage medium; a transmitting unit for transmitting the identification information read by the first reading unit; a receiving unit for receiving additional information stored in a second storage medium and corresponding to the identification information, the additional information being read out of the second storage medium based on the identification information transmitted by the transmitting unit; and a storage unit for storing the additional information received by the receiving unit in correlation to the data or the identification information.

According to a third aspect of the present invention, there is provided a terminal device comprising a first playback unit for playing back a first storage medium; a receiving unit for receiving identification information of data stored in a second storage medium; a reading unit for reading, based on the identification information received by the receiving unit, additional information stored in the first storage medium and corresponding to the identification information; and a transmitting unit for transmitting the additional information read by the reading unit.

According to a fourth aspect of the present invention, there is provided a recording and playback method comprising a first playback step of playing back a first storage medium;

a second playback step of playing back a second storage medium; a first reading step of reading identification information of data stored in the first storage medium; a second reading step of reading, based on the identification information, additional information stored in the second storage medium and corresponding to the identification information; and a storing step of storing the additional information in correlation to the data or the identification information.

According to a fifth aspect of the present invention, there is provided a transmitting/receiving method comprising a first playback step of playing back a first storage medium; a first reading step of reading identification information of data stored in the first storage medium; a transmitting step of transmitting the identification information read in the first reading step; a receiving step of receiving additional information stored in a second storage medium and corresponding to the identification information, the additional information being read out of the second storage medium based on the identification information transmitted in the transmitting step; and a storing step of storing the additional information received in the receiving step in correlation to the data or the identification information.

According to a sixth aspect of the present invention, there is provided a transmitting/receiving method comprising a first playback step of playing back a first storage medium; a receiving step of receiving identification information of data stored in a second storage medium; a reading step of reading, based on the identification information received in the receiving step, additional information stored in the first storage medium and corresponding to the identification information; and a transmitting step of transmitting the additional information read by the reading unit.

According to a seventh aspect of the present invention, there is provided a storage medium storing additional information corresponding to identification information of data stored in another storage medium.

With the first, second, fourth and fifth aspects of the present invention, identification information stored in a first storage medium is read, additional information corresponding to the identification information is read out of a second storage medium based on the identification information, and the additional information is stored in correlation to the data or the identification information that is stored in the first storage medium. Based on the stored additional information, therefore, a search can be made on the data or the identification information stored in the first storage medium.

Also, with the third and sixth aspects of the present invention, identification information stored in a second storage medium is received, and based on the received identification information, additional information stored in a first storage medium is read corresponding to the identification information stored in the second storage medium. The read additional information is then transmitted. Based on the additional information, therefore, a search can be made on the identification information stored in the second storage medium at the transmission destination.

Further, with the seventh aspect of the present invention, since a storage medium stores additional information corresponding to identification information of data stored in another storage medium, the additional information obtained upon playback of the storage medium can be used to make a search on the identification information of the data stored in the another storage medium.

BRIEF DESCRIPTION OF THE DRAWINGS

FIG. 12 is an illustration showing one example of a TOC information table;

FIG. 13 is an illustration showing one example of a file management table;

FIG. 14 is an illustration showing one example of configuration of a CD album information database;

DESCRIPTION OF THE PREFERRED EMBODIMENTS

Figure 1:
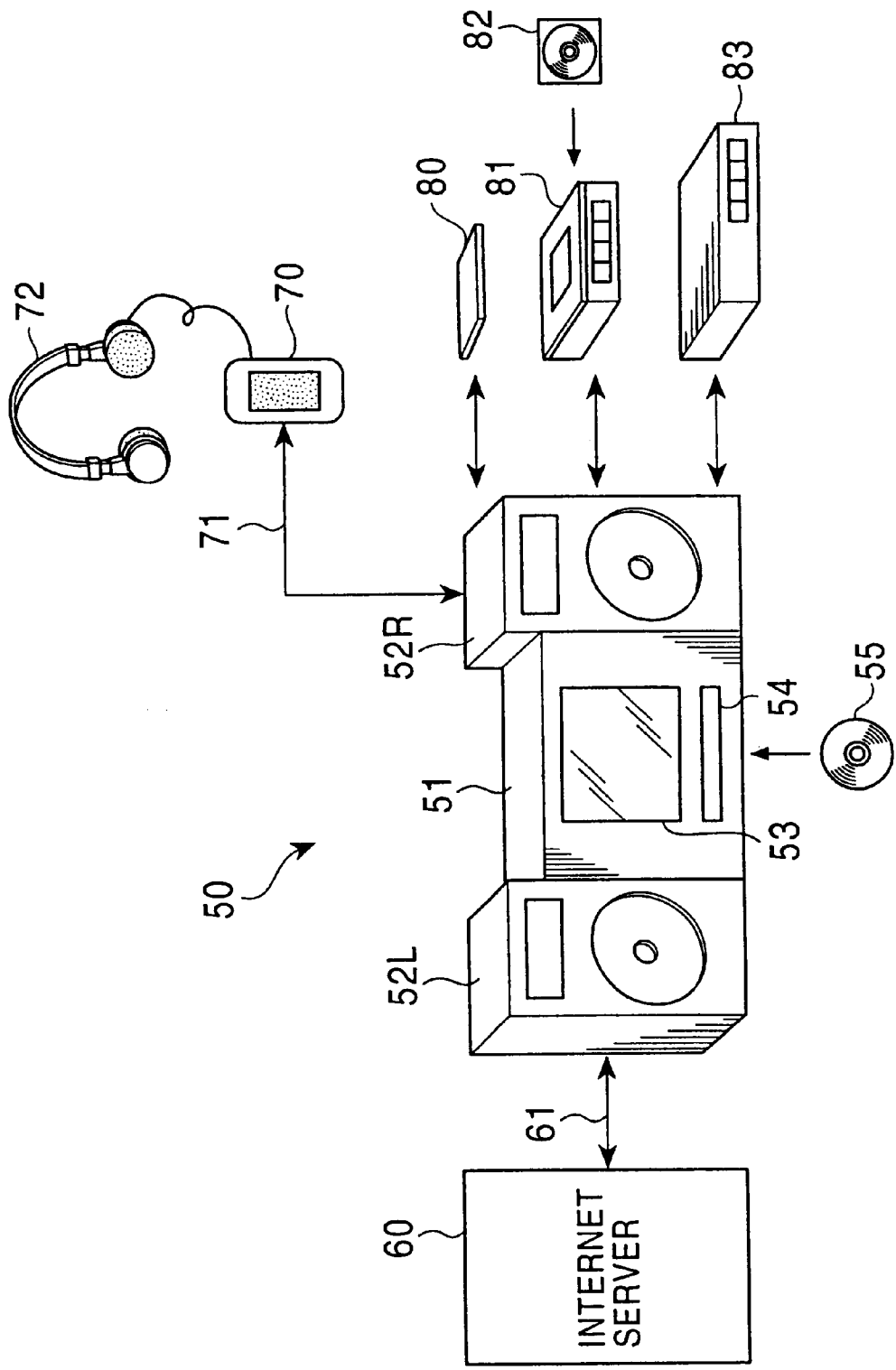
FIG. 1 is a diagram schematically showing a music server according to the present invention and a system employing the music server.

A first embodiment of the present invention will be described below with reference to the drawings. FIG. 1 schematically shows a music server to which the present invention can be applied, and a system employing the music server. A music server 50 comprises a main server unit 51 and a pair of left and right speaker units 52L, 52R. The main server unit 51 includes a display unit 53 comprising, e.g., an LCD (Liquid Crystal Display) panel, and a CD loader 54 through which a CD is inserted into the main server unit 51.

Though not shown in FIG. 1, the main server unit 51 also includes a console comprising a plurality of control switches with which the user can control the function of the main server unit 51. A signal receiving portion for receiving an infrared ray, for example, may be provided on the main server unit 51 to remotely control the function of the main server unit 51 by a remote commander. Further, the main server unit 51 includes a controller as described later, and various operations of the main server unit 51 are controlled by the controller in accordance with predetermined programs stored in, e.g., a ROM beforehand.

When the user loads a CD 55 in the main server unit 51 through the CD loader 54 and operates the control switches on the console (not shown) in a predetermined manner, playback of the CD 55 is started and a playback signal reproduced from the CD 55 is outputted through speaker units 52L, 52R, so that the user may enjoy music recorded on the CD 55. When the CD 55 includes a text data such as the titles of musical compositions, the titles and so on are displayed on the display unit 53 in accordance with the text data.

The music server 50 includes a large-capacity recording medium in the form of a hard disk (drive), for example. The recording medium in the form of a hard disk can record thereon playback data reproduced from the CD 55 which has been loaded in the main server unit 51 through the CD loader 54, when the user operates the control switches on the console (not shown) in the predetermined manner. On that occasion, it is possible to select one of an ordinary recording method of recording the data at the same transfer speed as the standard playback speed of the CD 55 and a high-speed recording method of recording the data at a transfer speed higher than the standard playback speed of the CD 55. In the recording at a high transfer speed, the user is allowed to select a CD or select a music composition recorded on a CD, and to record played-back data, i.e., music data reproduced from the CD, at a transfer speed higher than the standard playback speed of the CD.

In the music server 50, the music data reproduced from the CD 55 is coded and compressed by a predetermined method such as ATRAC, and then recorded as compressed music data. In this way, about 1000 pieces of music can be recorded or stored in a hard disk having a capacity of, e.g., 6 GBytes. A list of the titles of musical compositions recorded or stored in the hard disk is displayed on the display unit 53, for example. In accordance with the titles of musical compositions displayed on the display unit 53, the user can select and playback any desired one of the musical compositions recorded or stored in the hard disk. Because a hard disk is adapted for random access, a large amount of audio data recorded or stored in the hard disk can be read in any desired sequence and played back in a continuous manner.

While various methods are available for compression-coding, this first embodiment employs a method called ATRAC2 (Adaptive Transform Acoustic Coding 2) which is disclosed in U.S. Pat. No. 5,717,821, for example. This is a compression-coding method used in the portable audio data player described above, and is an advanced version of ATRAC. More specifically, according to ATRAC2, compression-coding of audio data is performed in a combination of transform coding and entropy coding by utilizing the masking effect and the frequency dependency of a minimum audible limit based on the auditory properties. Audio data can be encoded and decoded at a high speed with a relatively small scale of hardware while maintaining high sound quality.

The music server 50 can be connected to an external system, such as an Internet server 60 which is a server connected to the Internet, via a communication line 61 which is, e.g., a public telephone line. By connecting the music server 50 to the Internet server 60 via the communication line 61, the user can obtain information from the Internet. The Internet server 60 includes a database such as title information of commercially available music CDs. A specific key is allocated for the user to utilize the database. By operating the specific key at the time of utilizing the database, the user data can obtain data attendant on individual CDs, e.g., title information of the CDs.

Further, by connecting the music server 50 to, for example, a personal computer through a predetermined interface, the user can obtain data attendant on CDs using a database that is supplied to the personal computer from a storage or recording medium such as a CD-ROM.

The Internet server 60 also executes the billing process for the music server 50 depending on the service supplied to the user. When the user performs the above-described high-speed recording of the CD 55, data indicating the fact that the music server 50 is going to carry out the high-speed recording is communicated to the Internet server 60. The billing process is thereby executed for the user who is going to perform the high-speed recording. Then, the user is allowed to select a CD or a piece of music and to perform the high-speed recording.

The billing process has been described above as being executed by the Internet server 60 that includes various additional information attendant on CDs, but the present invention is not limited to such an example. As an alternative, the billing process may be executed by another server connected to the Internet. As a further alternative, the billing process may be executed via a dedicated network separate from the Internet.

A portable recording and playback unit 70 includes a storage medium comprising a hard disk or a flash memory. Any other suitable storage or recording medium is usable so long as it can follow the playback speed of music. By connecting the portable recording and playback unit 70 to the music server 50 through a connecting line 71, the music data recorded in the music server 50 can be transferred to the portable recording and playback unit 70 for recording on the storage medium in the unit 70. At this time, on the side of the music server 50, the music data that has been transferred to the portable recording and playback unit 70 is brought into such a state that the transferred music data still remains on the storage medium, such as a hard disk or a flash memory, but cannot be reproduced. The storage or recording medium used in the portable recording and playback unit 70 has a capacity on the order of, e.g., 200 MByte, and can store or record audio data for several tens pieces of music. Note that, in the following description, a storage device or medium comprising a semiconductor memory, such as a flash memory, and a recording medium in the form of a disk, such as a hard disk (i.e., a platter of a hard disk drive), will be referred to as a storage medium together.

The above-mentioned transfer method used in the present invention, i.e., transfer of the type that when music data is transferred, the music data is stored in a storage medium at the transfer destination while the transferred music data still remains on a storage medium at the transfer source but cannot be reproduced, is referred to as "movement". By utilizing the "movement", unlimited copying of the music data can be prohibited.

Although the music server 50 and the portable recording and playback unit 70 are connected to each other through the connecting line 71 in the above-described example, the present invention is not limited to such an arrangement. For example, mutually fitting portions may be provided on the music server 50 and the portable recording and playback unit 70. Thus, the portable recording and playback unit 70 may be jointly fitted to the music server 50 so that data is directly transferred between the server 50 and the unit 70. Instead of electrical connection, music data may be transferred between the music server 50 and the portable recording and playback unit 70 with an infrared signal, for example, by providing, in both the server 50 and the unit 70, interfaces for transferring data with an infrared signal in conformity with the IrDA (Infrared Data Association) standards.

Further, the music server 50 can transfer information between itself and various media by providing predetermined interfaces in the music server 50. For example, by providing an interface adapted for a PC card 80 in the music server 50, music data supplied from the PC card 80 can be taken into the server 50, and data can be transferred between a personal computer and the server 50. Also, by providing a serial digital interface using an optical cable, etc. in the music server 50, music data can be transferred between the server 50 and another digital music data recording and playback unit such as a disk recorder 81 using a small-sized magneto-optical disk with a diameter of 64 mm. In this example, a disk cartridge 82 containing a small-sized magneto-optical disk therein is loaded in the disk recorder 81, and music data played back from the magneto-optical disk in the disk cartridge 82 is supplied to the music server 50. Likewise, by providing an IEEE 1394 interface or the like in the music server 50, a set-top box for CATV (Cable Television) and satellite broadcasting, for example, can be connected to the server 50.

A PC card is a card type peripheral device for personal computers in conformity with the standards jointly stipulated by the PCMCIA (Personal Computer Memory Card International Association) in USA and JEIDA (Japan Electronic Industry Development Association). IEEE 1394 is the interface standard stipulated by the Institute of Electrical and Electronics Engineers.

The music server 50 may include, as an incorporated application, a WWW (World Wide Web) browser. By connecting the music server 50 to the Internet server 60 with the WWW browser, the music server 50 can search various contents described in, e.g., HTML (Hypertext Markup Language) and residing on the Internet, and can display the desired information on the display unit 53.

With the construction described above, the user can not only play back the music data stored or recorded in the music server 50, for example, for listening to the music data through the speaker units 52L, 52R, but also load the CD 55 in the server 50 for playback of the CD 55.

Communication between the music server 50 and the Internet server 60 enables the title information, etc. of the CD 55, which is loaded in the music server 50 through the CD loader 54, to be automatically obtained from the Internet server 60 via the communication line 61. The information obtained from the Internet server 60 is stored in the music server 50, and the stored title information, etc. are displayed on the display unit 53 of the music server 50 as needed.

More specifically, the information specific to the user (hereinafter referred to as user information), such as the user ID data of the music server 50, is sent from the music server 50 to the Internet server 60. On the side of the Internet server 60, the checking process and the billing process are executed in accordance with the received user information. Also, the media information of a CD required by the user or a CD under playback is sent from the music server 50 to the Internet server 60. In accordance with the received media information, the Internet server 60 searches for additional information attendant on the music data, such as the title of a music composition (song), the names of player (singer), composer and songwriter, words, and a jacket image. Then, the Internet server 60 transmits the certain information regarding the CD requested by the user back to the music server 50.

For example, the TOC (Table Of Contents) information of the CD 55 is sent as the media information to the Internet server 60. A database capable of searching for additional information corresponding to the music data based on the TOC information is constructed in the Internet server 60. The additional information may be obtained by searching another WWW server on the Internet. The Internet server 60 searches for the additional information corresponding to the music data by using the received TOC information as the media information. For example, the search can be made based on time information of each musical composition recorded on the CD 55, the time information being included in the TOC information.

The additional information obtained by the search is sent from the Internet server 60 to the music server 50. In the music server 50, the received additional information is displayed on the display unit 53 and written in a hard disk drive, for example, together with the TOC information of the CD 55 by a CPU 8 (described later). The additional information obtained by the search can be displayed on the music server 50 with the incorporated WWW browser software, by sending the additional information from the Internet server 60 to the music server 50 in the form of an HTML file.

If another URL (Uniform Resource Locator) is described in the additional information, the user can access, from the music server 50, the home page on the Internet indicated by the another URL.

Further, by communicating data between the music server 50 and the Internet server 60, the music data on the CD 55, which is loaded in the music server 50 through the CD loader 54, can be recorded on a storage medium in the music server 50 in about two minutes for each piece of CD, for example, at a higher speed than the standard playback speed prescribed for the CD 55. When no communication is made between the music server 50 and the Internet server 60, the music data on the CD 55 is recorded on a storage medium in the music server 50 at the same speed as the standard playback speed prescribed for the CD 55.

By connecting the music server 50 to the portable recording and playback unit 70 through the connecting line 71, the music data stored or recorded in the music server 50 can be transferred and moved to the portable recording and playback unit 70. The moved music data can be played back by the portable recording and playback unit 70 even when the server 50 and the unit 70 are not connected through the connecting line 71, allowing the user to listen to the played-back music data with a headphone 72, for example. On the side of the music server 50, the transferred and moved music data is brought into a state where it cannot be reproduced.

Figure 2:
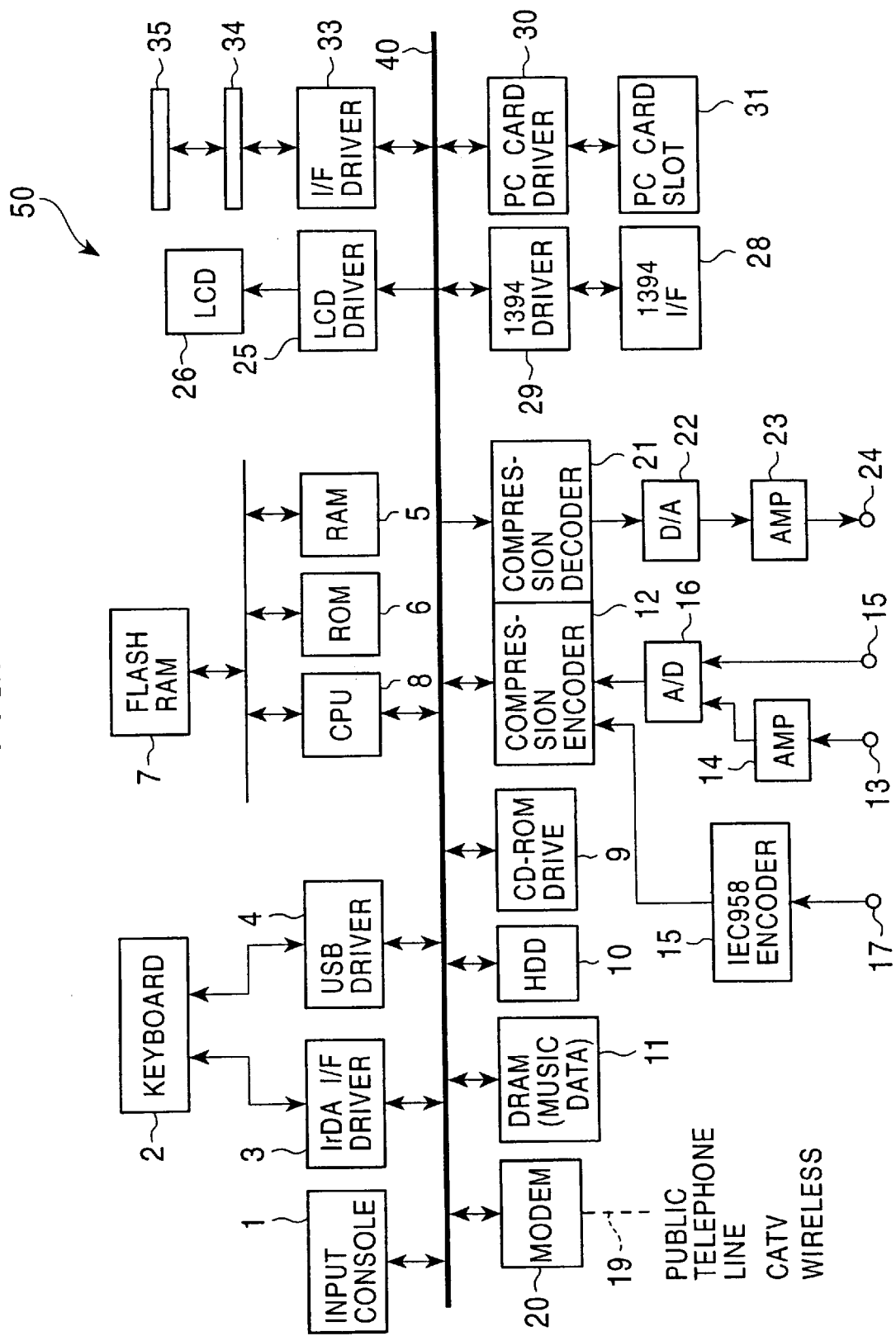
FIG. 2 is a block diagram showing one example of construction of the music server.

FIG. 2 shows one example of construction of the music server 50. Similarly to the construction of an ordinary personal computer, the music server 50 comprises a RAM 5, a ROM 6, a flash memory 7, and a CPU 8 which are interconnected via a bus 40. The CPU 8 is connected to the bus 40. The CPU 8 functions as a controller and controls the overall operation of the music server 50.

Programs for controlling the operation of the music server 50 are stored in the ROM 6 beforehand. In the music server 50, the stored programs enable the CPU 8 to execute the operation corresponding to the user's manipulation made on an input console 1 (described later). A data area and a task area, which are required for execution of the programs, are temporarily secured in the RAM 5 and the flash memory 7. A program loader is stored in the ROM 6 so that a program itself may be loaded in the flash memory 7 with the program loader stored in the ROM 6.

The input console 1 comprises, for example, a plurality of push- and rotary-type control keys and a plurality of switches operated respectively by the control keys. The input console 1 is not limited to such an example, but may comprise a rotatable push-type control member called a jog dial, a touch panel formed on an LCD, or the like. As a matter of course, a switch mechanism responsive to depression is also usable. A signal corresponding to the user's manipulation made on the input console 1 is supplied to the CPU 8 via the bus 40. In accordance with the signal from the input console 1, a control signal for controlling the operation of the music server 50 is produced by the CPU 8. The music server 50 is operated in accordance with the control signal produced by the CPU 8.

An infrared interface (IrDA I/F) driver 3 and/or a USB (Universal Serial Bus) driver 4 are connected to the bus 40. A keyboard 2 is connectable to the drivers 3, 4 by communication or electrical connection. Using the keyboard 2, the user can easily enter, for example, the title of a musical composition, the name of artist, etc. corresponding to the recorded music data. Also, data may be transferred through the infrared interface driver 3 or the USB driver 4. Incidentally, the infrared interface driver 3 and the USB driver 4 can be omitted.

A CD-ROM drive 9 is connected to the bus 40, and the CD 55 is loaded in the CD-ROM drive 9 through the CD loader 54 as described above. In the CD-ROM drive 9, the music data is read out of the set CD 55 at the standard playback speed prescribed for the CD 55. The CD-ROM drive 9 can also read the audio data on the CD 55 at higher speeds, e.g., at speeds 16 or 32 times as fast as the prescribed standard playback speed.

The CD-ROM drive 9 is not limited to the above-mentioned example, but may be adaptable for, e.g., a magneto-optical disk or a DVD (Digital Versatile Disk). Alternatively, a drive adaptable for a semiconductor memory connected to the external when used, such as a memory card, is also usable. Further, data read by the CD-ROM drive 9 is not limited to music data. Image data, text data, program data, etc. can also be read by the CD-ROM drive 9.

A hard disk drive (hereinafter abbreviated to HDD) 10 is connected to the bus 40. Music data read by the CD-ROM drive 9 is recorded in the HDD 10. Further, in this first embodiment, when music data is read by the CD-ROM drive 9 for recording in the HDD 10, the TOC information of the CD 55 loaded in the CD-ROM drive 9 is read. For example, in the management database, an album title or a first address pointer of the CD album information and file number or a first address pointer of the file management table are stored in a correlated manner. Though described later in detail, the TOC information is recorded in the HDD 10 in correlation to the music data read out of the CD 55.

As a pre-process for recording the music data in the HDD 10, the music data read by the CD-ROM drive 9 is supplied to a compression encoder 12 via the bus 40 and an audio DRAM 11.

The compression encoder 12 executes the compression-coding process of the music data by the compressing method disclosed in the above-cited U.S. Pat. No. 5,717,821, for example. A compression speed of the music data by the compression encoder 12 is selected from two low and high speeds under control of the CPU 8. The low compression speed corresponds to the standard playback speed prescribed for the CD 55 in the CD-ROM drive 9. The compression speed is switched over, for example, depending on the playback speed of the CD 55 by the CD-ROM drive 9. For example, an encoding algorithm depending on the compression speed is operated in the compression encoder 12.

A manner of changing the compression speed in the compression encoder 12 is not limited to the above-described example. As an alternative, the compression speed may be changed by switching over the clock frequency of the compression encoder 12, or by preparing separate units of hardware. Further, the compression encoder 12 capable of high-speed compression may be operated at a low compression speed through thinning of the processing.

The compressed music data resulting from the compression-coding executed by the compression encoder 12 is recorded and stored in the HDD 10 through the DRAM 11.

Although the compressed music data resulting from the compression-coding executed by the compression encoder 12 is stored in the HDD 10 in this embodiment, the music data read by the CD-ROM drive 9 may be directly supplied to the HDD 10 to be recorded and stored in a hard disk, i.e., a platter of the HDD 10.

In this embodiment, a sound signal inputted from a microphone, which is connected to a terminal 13, through an amplifier 14 and a sound signal inputted from a line input terminal 15 are supplied to the compression encoder 12 through an A/D converter 16. Those sound signals can be thus recorded in the HDD 10 after being subjected to compression-coding by the compression encoder 12. Further, a digital optical signal is supplied to the compression encoder 12 from a digital optical terminal 17 through an IEC 958 (International Electrotechnical Commission 958) encoder 18. A sound signal supplied as a digital optical signal can be thus recorded on the platter of the HDD 10 after the compression-coding by the compression encoder 12.

The compression encoder 12 has been described as using the encoding algorithm disclosed in the above-cited U.S. Pat. No. 5,717,821, but the present invention is not limited to the above example. The compression encoder 12 may use any other suitable encoding algorithm so long as it can compress information. For example, any of other encoding algorithms such as MPEG (moving picture coding experts group), PASC (precision adaptive sub-band coding), TwinVQ (trade name), RealAudio (trade name), and LiquidAudio (trade name) is also usable in the compression encoder 12.

A modem 20 is connected to the bus 40. An external network 19, such as a public telephone line, CATV or wireless communication, is connected to the modem 20. The music server 50 can communicate with the external network 19 through the modem 20.

The music server 50 is connected to, e.g., the Internet via the external network 19 for communication with the Internet server 60 in a remote location. Various information including a request signal, the media information regarding the CD 55 loaded in the CD-ROM drive 9, the user ID data assigned to the music server 50 in one-to-one relation beforehand, the user information, and billing information for the user are transmitted from the music server 50 to the Internet server 60.

When the various information such as the media information and the user information are transmitted to the Internet server 60, the Internet server 60 executes the checking process and the billing process in accordance with the user information such as the user ID data, and searches for the additional information corresponding to the music data based on the received media information, the found additional information being sent back to the music server 50.

Although the additional information corresponding to the music data is sent back to the music server 50 in the above example, the music data may be directly supplied via the external network 19 in response to a user's request. In other words, the user can download music data from the Internet server 60 by using the music server 50. Thus, music data can be sent back in accordance with the media information. This feature enables, for example, the user to obtain a bonus track of a predetermined CD through communication.

The compressed music data, which has been recorded and stored in the HDD 10 after being coded and compressed by the compression encoder 12, is read out of the HDD 10 for playback and the read data is supplied to a compression decoder 21. The compressed music data read out of the HDD 10 is decoded and decompressed in the compression decoder 21, and the decoded music data is introduced to a terminal 24 through a D/A converter 22 and an amplifier 23. The music data is then supplied from the terminal 24 to the speaker units 52L, 52R for playback of music. Though not shown in FIG. 2, there are actually provided two signal lines from the D/A converter 22 to the terminal 24 through the amplifier 23 corresponding to stereo outputs. Likewise, there are also two terminals 24 corresponding to stereo outputs.

The compression decoder 21 uses a decoding algorithm corresponding to the encoding algorithm used in the compression encoder 12. The compression decoder 21 and the compression encoder 12 may implement their functions through software processing executed by the CPU 8 without resorting to hardware.

A liquid crystal display device (hereinafter referred to as an LCD) 26, which constitutes the display unit 53, is connected to the bus 40 through an LCD driver 25. A drawing control signal is supplied from the CPU 8 to the LCD driver 25 via the bus 40. The LCD 26 is operated by the LCD driver 25 in accordance with the supplied drawing control signal, and certain display is made on the display unit 53.

For example, an operating menu of the music server 50 is displayed on the LCD 26. As another example, a title list of the compressed music data, which has been recorded and stored in the HDD 10, is displayed on the LCD 26. Display of the title list on the LCD 26 is performed based on data stored in the HDD 10 because the additional information transmitted from the Internet server 60 is supplied to the HDD 10 after being decoded. As still another example, a folder or a jacket image corresponding to the compressed music data, which has been selected for playback, may be displayed on the LCD 26 in accordance with the additional information transmitted from the Internet server 60.

When the user operates a pointing device in the input console 1 or the keyboard 2 based on the display on the LCD 26, the CPU 8 starts playback control of the music data instructed by the user. Further, based on the display on the LCD 26, the user can instruct the CPU 8 to control not only erasure of the selected music data, but also copying and movement of the selected music data to an external device. For example, where the input console 1 is in the form of a touch panel provided on the LCD 26, the user can operate the music server 50 by touching the touch panel following the display on the LCD 26. Thus, the user can manage and control the music data recorded and stored in the HDD 10 by utilizing the LCD 26 as an interface.

This first embodiment is adapted for IEEE 1394 and a PC card to interface between the music server 50 and external general information equipment. To that end, an IEEE 1394 interface 28 is connected to the bus 40 through an IEEE 1394 driver 29. Likewise, a PC card slot 31 is connected to the bus 40 through a PC card driver 30.

Data can be transferred between the music server 50 and a personal computer, for example, through the IEEE 1394 interface 28. Also, the IEEE 1394 interface 28 enables music data to be taken in from an IRD (Integrated Receiver/Decoder) for satellite broadcasting, a small-sized magneto-optical disk or an optical disk with a diameter of about 64 mm, a DVD (Digital Versatile Disk), a digital video tape, etc. By loading a PC card into the PC card slot 31, it is possible to easily achieve system expansion including various peripheral equipment such as an external storage or any other media drive, a modem, a terminal adapter, and a capture board.

An interface 34 serves as an interface through which music data, etc. is transferred between the music server 50 and another corresponding recording and playback apparatus. The other recording and playback apparatus comprises, e.g., the above-mentioned portable recording and playback unit 70 shown in FIG. 1. Alternatively, the other recording and playback apparatus may comprise another music server.

The interface 34 is connected to the bus 40 through an interface driver 33. The other recording and playback apparatus includes an interface 35 in match with the interface 34. By electrically connecting both the interfaces 34 and 35 through the predetermined connecting line 71, the music data recorded and stored in the HDD 10, for example, can be transferred from the music server 50 to the other recording and playback apparatus.

In the above description, the coded and compressed music data is recorded in the HDD 10 of the music server 50, but a storage medium for the music data is not limited to a hard disk drive. For example, a semiconductor memory detachably attached to the main music server unit 51 may be used as a recording medium for the music data.

Figure 3:
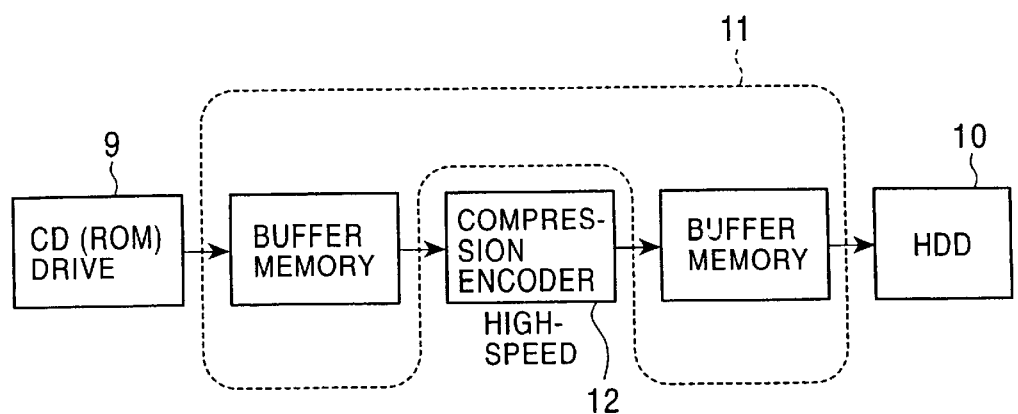
FIG. 3 schematically shows a signal flow in the process during which music data is read by a CD-ROM drive and recorded in a hard disk drive (HDD)

FIG. 3 schematically shows a signal flow in the process during which music data is read by the CD-ROM drive 9 and recorded in the HDD 10. The music data read by the CD-ROM drive 9 is once stored in the DRAM 11 serving as a buffer memory via the bus 40. The music data is read out of the DRAM 11 at predetermined timing and supplied to the compression encoder 12 via the bus 40. The compression encoder 12 is set, as described above, to the predetermined compression speed corresponding to the playback speed of the CD-ROM drive 9. The music data is coded and compressed by the compression encoder 12 and then stored again in the DRAM 11 serving as a buffer memory. The compressed music data is read out of the DRAM 11 at predetermined timing and supplied to the HDD 10 via the bus 40 for recording on the platter of the HDD 10. On this occasion, as described above, the information of the CD 55 under playback by the CD-ROM drive 9 is transmitted to the Internet server 60, and the additional information attendant on the CD 55 transmitted from the Internet server 60 is also recorded on the platter of the HDD 10. Then, the additional information is managed by the CPU 8, etc. as one group of data together with the compressed music data obtained from the music data that has been read out of the CD 55.

Figure 4:
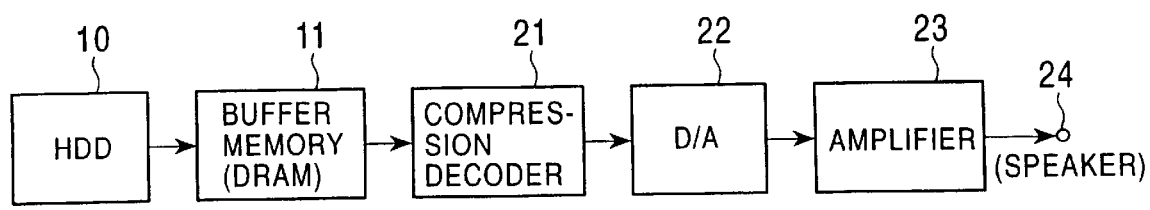
FIG. 4 schematically shows a signal flow in the process during which compressed music data is read out of the hard disk drive and introduced to a terminal after being subjected to the reproducing process for playback.

FIG. 4 schematically shows a signal flow in the process during which the compressed music data is read out of the HDD 10 and introduced to the terminal 24 after being subjected to the reproducing process for playback. The compressed music data read out of the HDD 10 is once stored in the DRAM 11 serving as a buffer memory via the bus 40. The compressed music data is read out of the DRAM 11 at predetermined timing and supplied to the compression decoder 21 via the bus 40. The compressed music data is decoded and decompressed by the compression decoder 21, and resulting music data is supplied to the D/A converter 22. The music data is converted into an analog sound signal by the D/A converter 22 and is introduced, as a playback output, to the terminal 24 after being amplified by the amplifier 23. If a speaker is connected to the terminal 24, the user can enjoy the played-back music through the speaker. On this occasion, the additional information read out of the HDD 10 along with the compressed music data is decoded by the CPU 8, for example, and the title of a music composition, etc. are displayed on the display unit 53.

Figure 5:
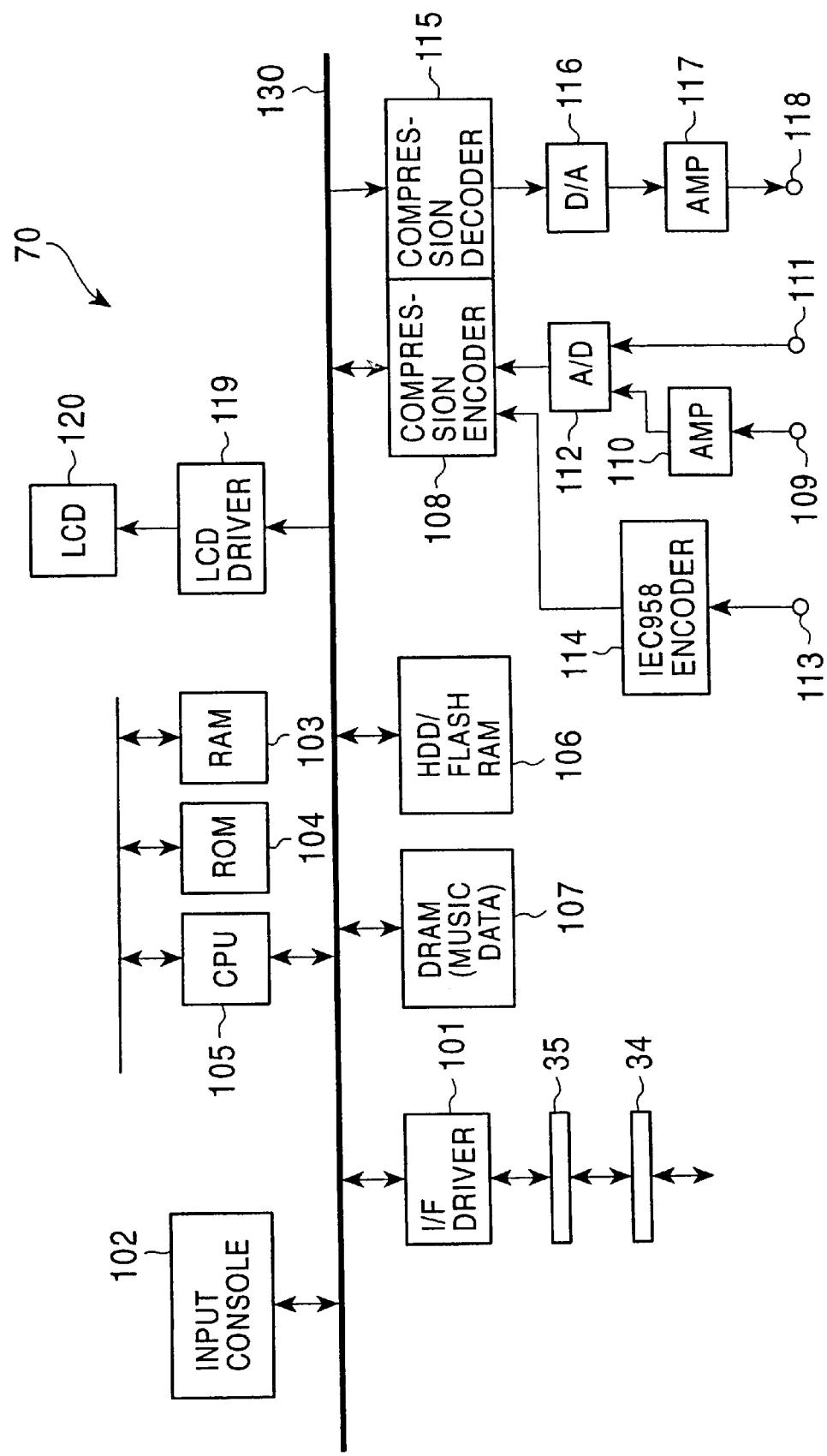
FIG. 5 is a block diagram showing one example of construction of a portable recording and playback unit.

FIG. 5 shows one example of construction of the portable recording and playback unit 70 that is employed as the above-mentioned other recording and playback apparatus. The portable recording and playback unit 70 has basically the same construction as that of the music server 50 shown in FIG. 2. Usually, the interface 34 on the side of the music server 50 is disconnected from the interface 35 on the side of the portable recording and playback unit 70, and the unit 70 is carried as a single unit with the user.

Similarly to the construction of an ordinary personal computer, the portable recording and playback unit 70 comprises a RAM 103, a ROM 104, and a CPU 105 which are interconnected via a bus 130. Of course, a flash memory may also be provided as with the above-described construction of the music server 50. The CPU 105 is connected to the bus 130. The CPU 105 functions as a controller and controls the overall operation of the portable recording and playback unit 70.

Programs for controlling the operation of the portable recording and playback unit 70 are stored in the ROM 104 beforehand. In the portable recording and playback unit 70, the stored programs enable the CPU 105 to execute the operation corresponding to the user's manipulation made on an input console 102 (described later). A data area and a task area, which are required for execution of the programs, are temporarily secured in the RAM 103.

The input console 102 comprises, for example, a plurality of push- and rotary-type control keys and a plurality of switches operated respectively by the control keys. The input console 102 is not limited to such an example, but may comprise a rotatable push-type control member called a jog dial, a touch panel formed on an LCD (described later), or the like. As a matter of course, a mechanical switch mechanism responsive to depression is also usable. A signal corresponding to the user's manipulation made on the input console 102 is supplied to the CPU 105 via the bus 130. In accordance with the signal outputted from the input console 102 corresponding to the user's manipulation of the control key made on the input console 102, the CPU 105 produces a control signal for controlling the operation of the portable recording and playback unit 70. The operation of the portable recording and playback unit 70 is switched over and controlled in accordance with the control signal produced by the CPU 105.

The music data, which is read out of the HDD 10 and instructed to be transferred from the music server 50 to the portable recording and playback unit 70, is transferred or supplied to the unit 70 through the interface 34, the interface 35 and the connecting line between both the interfaces 34, 35. At the same time, the additional information corresponding to the music data, which has been instructed to be transferred, is also transmitted to the portable recording and playback unit 70 along with the transferred music data. Where mutually fitting portions are provided on the music server 50 and the portable recording and playback unit 70, both the interfaces 34, 35 are directly connected to each other so that the music data is transferred between the server 50 and the unit 70. Alternatively, where IrDA interfaces are provided on both the server 50 and the unit 70, the music data is transferred between the server 50 and the unit 70 using an infrared signal.

The music data transferred from the music server 50 to the portable recording and playback unit 70 is supplied to an HDD 106, which is a music data recording medium in the unit 70, via an interface driver 101 and the bus 130 for recording on a platter of the HDD 106.

The music data recording medium in the portable recording and playback unit 70 is not limited to the HDD 106, but may comprise a flash memory, for example. Further, any other suitable recording medium, such as a magneto-optical disk, can be used as the audio data recording medium so long as it is able to follow the playback speed of the audio data. When the music data recording medium in the portable recording and playback unit 70 has a storage capacity on the order of, e.g., 200 MByte, it can record several tens pieces of music. The platter of the HDD 106 in the unit 70 records thereon the music data transmitted from the music server 50 along with the additional information corresponding to the transmitted audio data.

In this embodiment, the music data transferred and recorded in the HDD 106 is compressed music data that has been already subjected to the compression-coding in the music server 50. The present invention is not limited to this embodiment, and the portable recording and playback unit 70 may be supplied with music data, which has not been coded and compressed, for recording on the platter of the HDD 106. In such a case, the music data played back and read out of the CD 55 loaded in the CD-ROM drive 9 of the music server 50 is directly supplied to the portable recording and playback unit 70 through the interface driver 101. It is however needless to say that, when the music data is directly supplied to the unit 70, the amount of recordable music data is noticeably restricted.

As a pre-process for recording the music data on the platter of the HDD 106, the supplied music data is temporarily stored in an audio DRAM 107 connected to the bus 130. The music data read out of the DRAM 107 is supplied to a compression encoder 108 via the bus 130. The compression encoder 108 executes the compression-coding process of the music data by the same encoding algorithm as used in the compression encoder 12 of the music server 50. The music data coded and compressed by the compression encoder 108 is supplied to the DRAM 107 and temporarily stored in the DRAM 107 again. Finally, the compressed music data stored in the DRAM 107 is read and recorded on the platter of the HDD 106.

As described above, when the compressed music data stored in the HDD 10 is instructed to move, i.e., to be transmitted and transferred, from the music server 50 to the portable recording and playback unit 70, the compressed music data in the HDD 10 is brought into such a state that the transferred music data still remains in the HDD 10, but cannot be read out of the HDD 10 for reproduction. The compressed music data having been moved to the unit 70 can be reproduced at the movement source, i.e., in the music server 50, only when the moved audio data is returned back to the recording medium at the movement source, i.e., to the HDD 10 in the music server 50. At this time, the compressed music data returned to the music server 50 is deleted from the recording medium at the movement destination, i.e., the platter of the HDD 106 in the unit 70.

In this embodiment, a sound signal inputted from a microphone, which is connected to a terminal 109, through an amplifier 110 and a sound signal inputted from a line input terminal 111 are supplied to the compression encoder 108 through an A/D converter 112. Those sound signals supplied through the A/D converter 112 can be thus recorded in the HDD 106 after being coded and compressed by the compression encoder 108. Further, a digital optical signal is supplied to the compression encoder 108 from a digital optical terminal 113 through an IEC 958 encoder 114. A sound signal supplied as a digital optical signal can be thus recorded on the platter of the HDD 106 after being coded and compressed by the compression encoder 108. If the portable recording and playback unit 70 is a play-only unit that is able to only play back the compressed music data, the above-mentioned A/D converter 1 12, compression encoder 108, etc. can be all dispensed with.

The compressed music data is read out of the HDD 106 for playback and supplied to the compression decoder 115 via the bus 130. The supplied compressed music data is subjected to the decompressing process in the compression decoder 115, and resulting decoded and decompressed music data is introduced to a terminal 118 through a D/A converter 116 and an amplifier 117. For example, the headphone 72 is connected to the terminal 118. The user can listen to the played-back music by putting on the headphone 72. Though not shown in FIG. 5, there are actually provided two signal lines from the D/A converter 116 to the terminal 118 through the amplifier 117 corresponding to stereo outputs for L- and R-channels. Likewise, the terminal 118 is also provided two corresponding to stereo outputs for L- and R-channels.

An LCD 120 is connected to the bus 130 through an LCD driver 119. A drawing control signal is supplied from the CPU 105 to the LCD driver 119 via the bus 130. The LCD 120 is operated in accordance with the supplied drawing control signal, and certain display is made on the LCD 120. An operating menu of the portable recording and playback unit 70, a title list of the music data stored in the HDD 106, etc. are displayed on the LCD 120. As another example, a folder or a jacket image corresponding to the audio data, which has been selected from the music data stored in the HDD 106 for playback, may be displayed on the LCD 120 in accordance with the additional information stored in the HDD 106.

When the user operates a pointing device in the input console 102 based on the display on the LCD 120, one set of the compressed music data stored in the HDD 106 is selected and played back. Further, based on the display on the LCD 120, the user can instruct the CPU 105 to control erasure, copying and movement of the selected compressed music data. For example, the user can input an instruction for operating the portable recording and playback unit 70 by touching a touch panel provided on the input console 102 following the display on the LCD 120. Thus, the user can control management, recording and playback of the compressed music data recorded in the HDD 106 by utilizing the LCD 120 as an interface.

Though not shown in FIG. 5, the portable recording and playback unit 70 is driven by a battery. Therefore, the unit 70 includes a power supply unit and a charging unit. The power supply unit comprises, as a power supply source, a general secondary battery or dry cell. Where the music server 50 and the portable recording and playback unit 70 are directly connected to each other through a connecting line or mutually fitting portions, electric power is supplied to the charging unit together with transfer of the music data for charging the secondary battery in the unit 70. As a matter of course, the secondary battery in the unit 70 may be charged using an external charging power source. Incidentally, either one of a non-charging power source using a dry cell and a charging power source using a secondary battery may be provided as the power supply unit.

Figure 6:
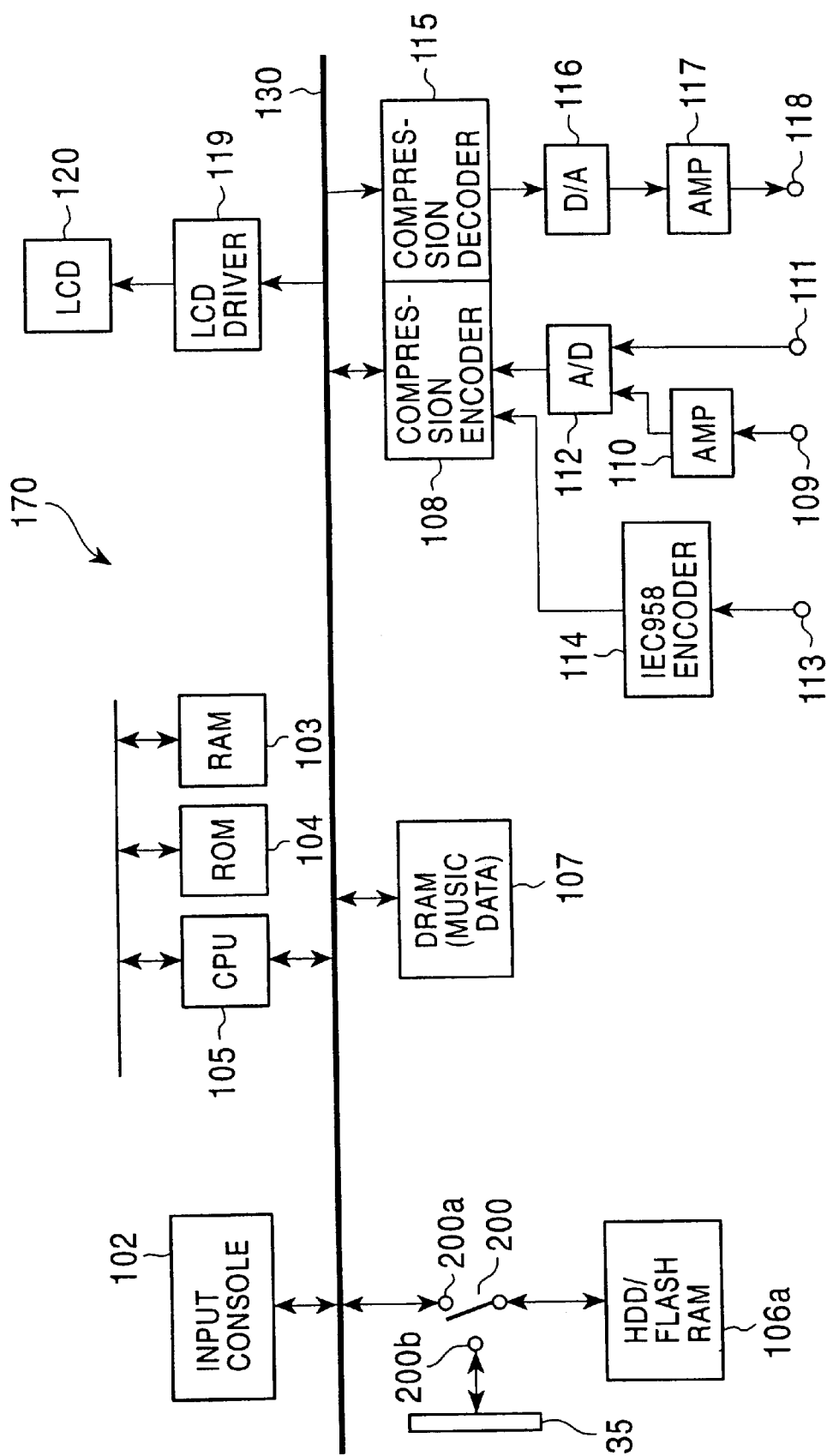
FIG. 6 is a block diagram showing another example of the portable recording and playback unit.

FIG. 6 shows another example of the portable recording and playback unit 70. Note that components in FIG. 6 common to those in FIG. 5 are denoted by the same numerals and a detailed description thereof is not repeated here. A portable recording and playback unit 170 shown in FIG. 6 differs in construction from the unit 70 shown in FIG. 5 in that a switch circuit 200 is interposed between an HDD (or a flash memory) 106a and the bus 130. One contact terminal 200a of the switch circuit 200 is connected to the bus 130, and the other contact terminal 200b is connected to the interface 35. The HDD 106a and the bus 130 are separable by the switch circuit 200.

When the compressed music data is transferred from the music server 50, the switch circuit 200 is changed over to the side of the contact terminal 200b to establish a closed circuit through the selected contact terminal 200b. The HDD 106a and the bus 40 of the music server 50 are thereby directly connected to each other through the interfaces 34 and 35. Looking the HDD 106a from the CPU 8 of the music server 50 in such a condition, the HDD 106a appears as a recording medium in the music server 50. Accordingly, the CPU 8 of the music server 50 can directly control the HDD 106a. This arrangement enables the compressed music data to be more easily moved and copied between the music server 50 and the portable recording and playback unit 170.

Figure 7:
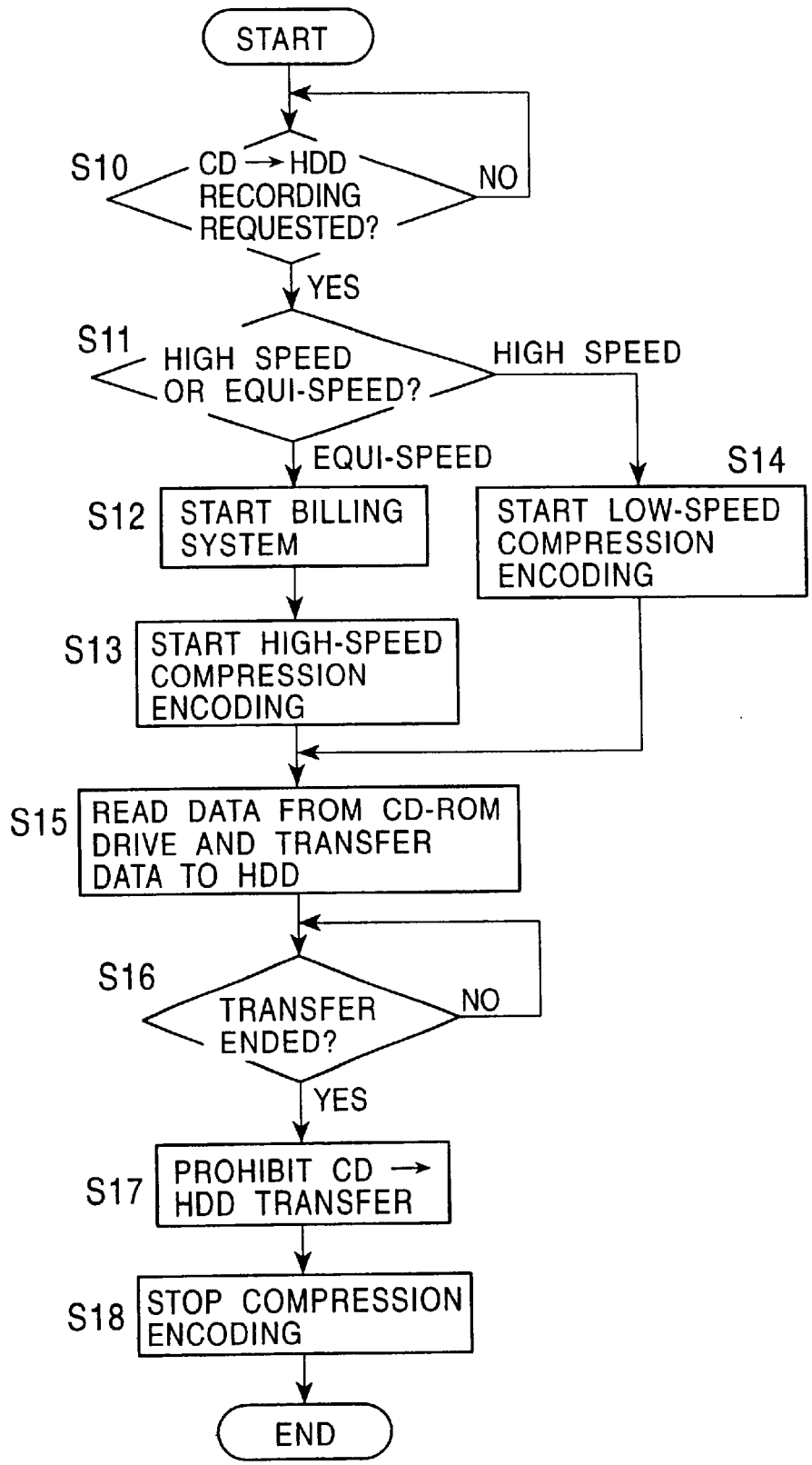
FIG. 7 is a flowchart showing one example of processing executed when music data on a CD is recorded in the hard disk drive in the music server.

The operation of the system thus constructed will be described below. A description is first made of the function executed by the music server 50 alone. FIG. 7 is a flowchart showing one example of processing executed when music data on the CD 55 loaded in the CD-ROM drive 9 is recorded on the platter of the HDD 10 in the music server 50.

In first step S10, the CPU waits for a request from the user for recording the music data on the CD 55 into the HDD 10. If the user enters a recording request through the input console 1, for example, the process goes to step S11. In step S11, it is determined whether the recording requested by the user is "high-speed recording" or "equi-speed recording". A recording method, i.e., "high-speed recording" or "equi-speed recording", is designated, for example, at the same time as when a recording request is issued in above step S10. The term "equi-speed recording" used herein means the operation of reading the music data at the standard speed prescribed for the CD 55 and recording the read data on the platter of the HDD 10. The term "high-speed recording" used herein means the operation of reading the music data at a speed two or more times as fast as the standard speed prescribed for the CD 55 and recording the read data on the platter of the HDD 10.

If "high-speed recording" is designated in step S11, the process goes to step S12. In step S12, billing systems in the servers 50 and 60 are started up. Processing executed by the billing systems in the servers 50 and 60 will be described later. After the billing process is executed by the billing system in the music server 50 and the high-speed recording is permitted by the Internet server 60, etc., the process goes to step S13 where the high-speed compressing process is started in the compression encoder 12. Thereafter, the process goes to step S15.

On the other hand, if "equi-speed recording" is designated in step S11, the process goes to step S14 where the low-speed compressing process is started in the compression encoder 12. Thereafter, the process goes to step S15.

In step S15, the CD-ROM drive 9 is driven at the predetermined speed under control of the CPU 8, and the music data recorded on the CD 55, which is loaded in the CD-ROM drive 9, is read out of the CD 55. The read audio data is coded and compressed by the compression encoder 12 and transferred to the HDD 10 for recording on its platter.

If it is determined in step S16 that the music data read out of the CD 55 has been completely transferred to the HDD 10 after the compression, data transfer from the CD-ROM drive 9 to the HDD 10 is prohibited in step S17. In next step S18, the compression-coding process by the compression encoder 12 is stopped.

Figure 8:
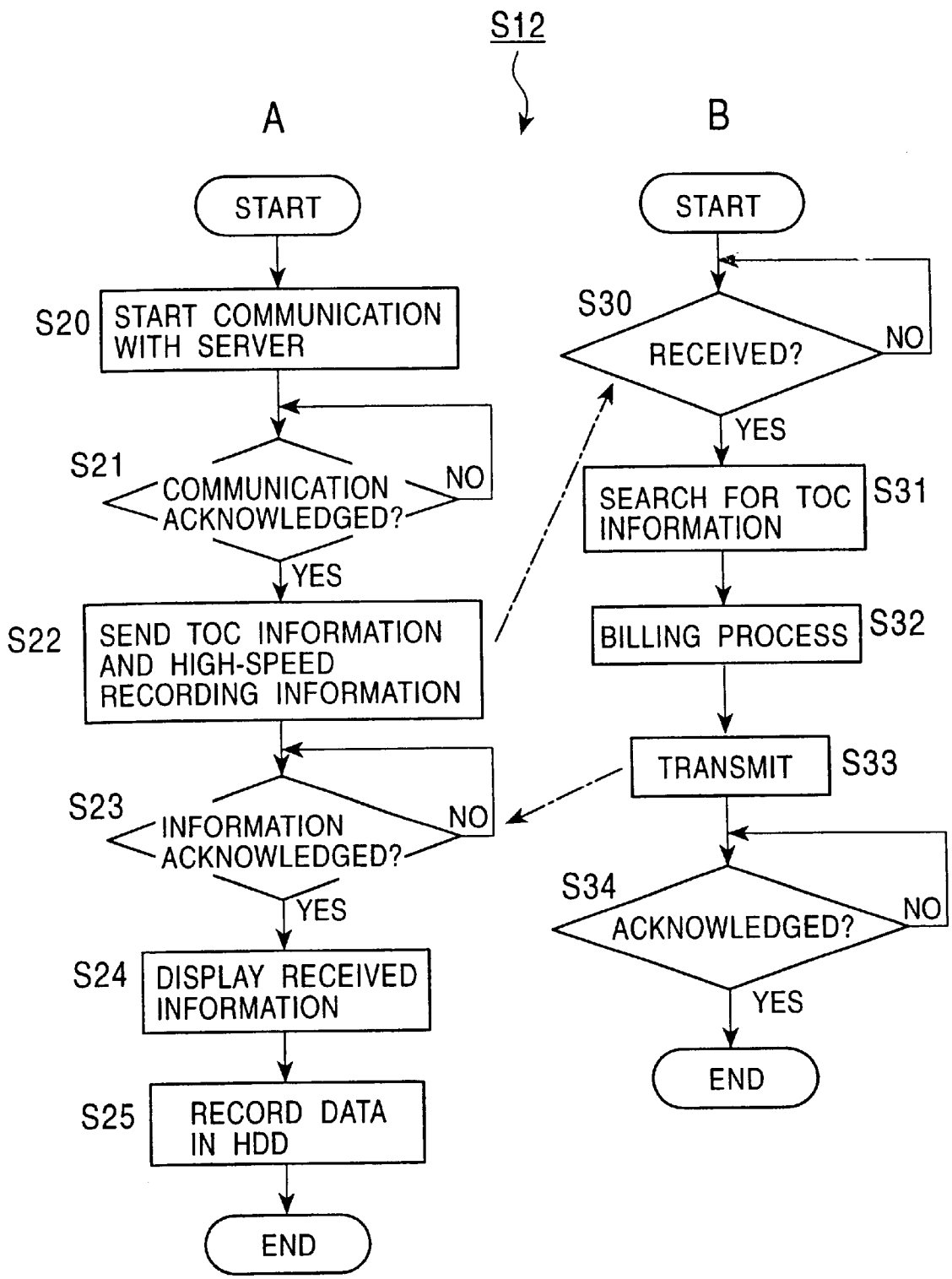
FIG. 8 is a flowchart showing one example of the billing process executed when the CD music data is recorded in the hard disk drive at a high speed.

FIG. 8 is a flowchart showing one example of the billing process executed by the billing system in step S 12 of the flowchart shown in FIG. 7. The billing process is executed through data communication between the music server 50 and the Internet server 60. A in FIG. 8 shows the billing process executed by the billing system in the music server 50, and B in FIG. 8 shows the billing process executed by the billing system in the Internet server 60.

After the start of the billing process, in step S20 data communication is started between the music server 50 and the Internet server 60 in accordance with a predetermined protocol. If it is confirmed that connection between both the servers 50 and 60 is established to be ready for communication between both the servers 50 and 60, the process goes to step S22.

In step S22, a user ID and the TOC information of the CD 55, which is loaded in the CD-ROM drive 9 and from which the music data is transferred and recorded in the HDD 10, is sent from the music server 50 to the Internet server 60. Along with the user ID and the TOC information of the CD 55, high-speed recording information indicating selection of the high-speed recording is sent from the music server 50 to the Internet server 60.

On the other hand, in B of FIG. 8, the Internet server 60 waits until the high-speed recording information, the user ID, and the TOC information are supplied and transmitted from the music server 50 (step S30). If the high-speed recording information, the user ID and the TOC information are received by the Internet server 60, a database in the Internet server 60 or an external database is searched in step S31 based on the transmitted TOC information. The CD 55 is identified by search for information corresponding to the TOC information.

The billing process is executed in next step S32. An amount of money to be billed is computed based on information such as the number of musical compositions which have been subjected to the high-speed recording. The billing can be performed, for example, by drawing the billed amount on the account, which has been opened with a bank and designated by the user, in accordance with the credit card number of the user ID registered in advance. The billing method is not limited to the above example. For example, the billing can be performed by a method of providing a function of reading a prepaid card in the music server 50, sending the preset billed amount to the music server 50, and subtracting the billed amount from the prepaid card inserted by the user. It is also possible to, in accordance with the TOC information, change the billed amount depending on the contents of the CD 55 and prohibit recording of the music data read out of the CD 55 on the platter of the HDD 10.

In step S33, the billing information is sent to the music server 50. Then, as shown in A of FIG. 8, the substance of the transmitted billing information is acknowledged on the side of the music server 50 (step S23). Also, whether the billing information has been received by the music server 50 is acknowledged on the side of the Internet server 60 (step S34). When the billing information has been correctly received by the music server 50 without errors, the fact can be acknowledged, for example, by transmitting acknowledgement data from the music server 50 to the Internet server 60.

Returning to A, if the billing information received on the side of the music server 50 is acknowledged in step S23, the process goes to step S24 where the received billing information, etc. are displayed on the display unit 53. In step S25, the music data is read out of the CD 55 at a high speed by the CD-ROM drive 9 and subjected to the compression-coding process at a high-speed compression speed in the compression encoder 12. The compressed music data from the compression encoder 12 is supplied to the HDD 10 and recorded on the platter of the HDD 10. Step S25 corresponds to above step S15 in FIG. 7.

Figure 9:
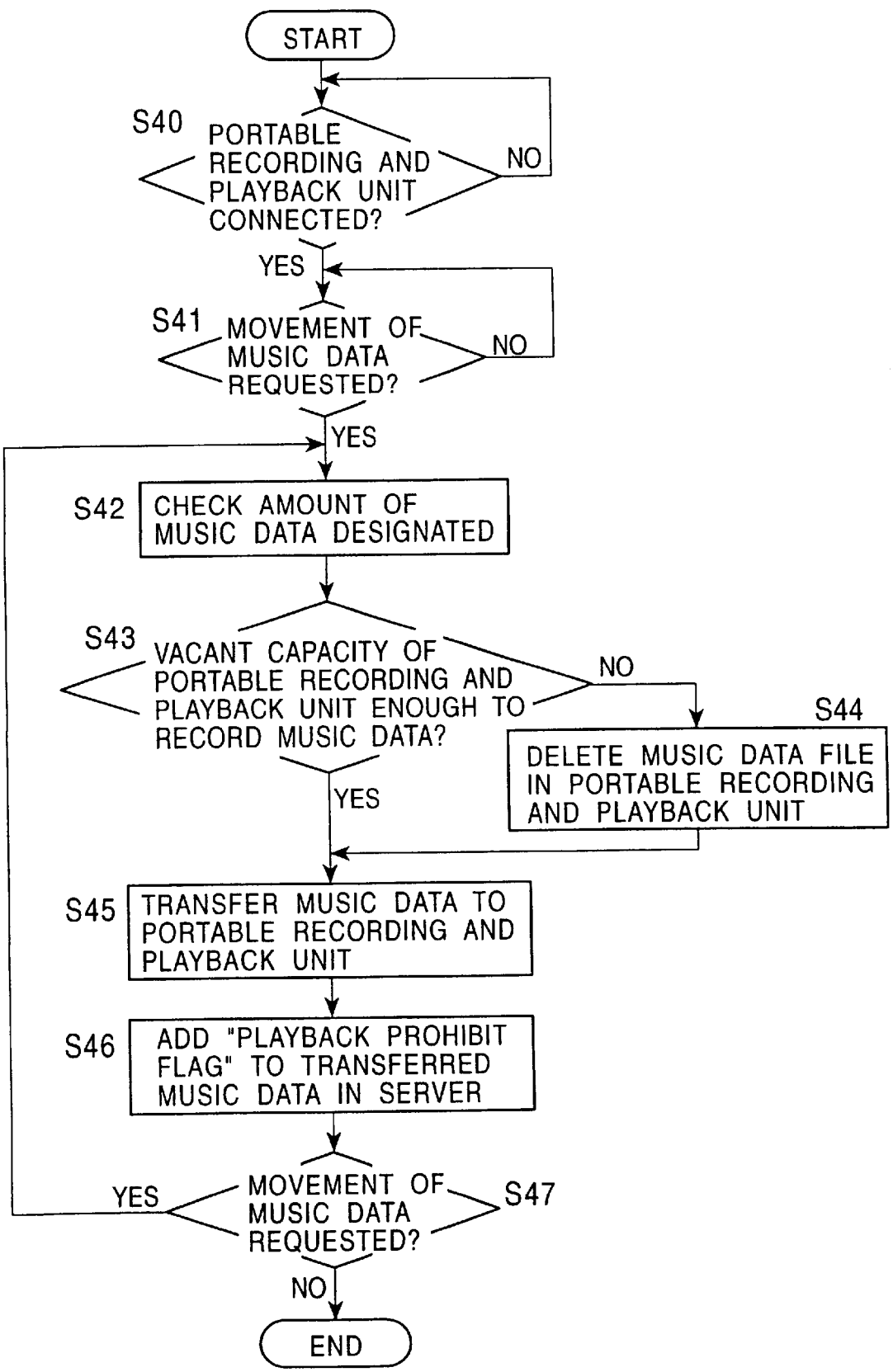
FIG. 9 is a flowchart showing one example of processing to move the music data according to the present invention.

In this first embodiment of the present invention, the music server 50 and the portable recording and playback unit 70 can operate in a cooperative manner. For example, when music data is moved from the music server 50 to the portable recording and playback unit 70, the cooperation is carried out between the server 50 and the unit 70. FIG. 9 shows a flowchart of one example of the movement of music data.

First, it is determined in step S40 whether the music server 50 and the portable recording and playback unit 70 are connected at the interfaces 34 and 35. The connection between the music server 50 and the portable recording and playback unit 70 can be detected, for example, by transferring a predetermined signal between the server 50 and the unit 70. A manner of detecting the connection between the music server 50 and the portable recording and playback unit 70 is not limited to such an example, but may be performed with a mechanical detecting mechanism. In other words, a mechanical switch mechanism may be provided at a joint portion between the server 50 and the unit 70 to detect the connection between them.

If the connection between the music server 50 and the portable recording and playback unit 70 is confirmed in step S40, next step S41 determines whether it is requested to move the music data, which is recorded and stored in the HDD 10, to the portable recording and playback unit 70. For example, a list of information about the compressed music data stored in the HDD 10, including the titles of music compositions and so on, is displayed on the display unit 53, and the user selects certain one set of the compressed music data from the list displayed on the display unit 53 by using the pointing device in the input console 1. Further, an instruction for movement of the selected compressed music data to the portable recording and playback unit 70 is entered by the user through the input console 1.

Various manners are conceivable to enter an instruction for movement of the selected music data through the input console 1. For example, a button for instructing movement of the selected music data is displayed on the display unit 53, and the user designates the button by using the pointing device in the input console 1. As another example, an icon is displayed on the display unit 53 for each set of the compressed music data, and the user moves a desired one of the icons onto an icon indicating the portable recording and playback unit 70 as the movement destination, which is displayed on the display unit 53, in the so-called drag and drop fashion. As a matter of course, an instruction for movement of the selected music data may be entered by operating a control switch provided on the input console 1.

If it is determined in step S41 that movement of the compressed music data is requested, the file size, i.e., the data amount, of the compressed music data, for which movement has been instructed, is checked in step S42 by, e.g., the CPU 8 of the music server 50. In next step S43, a free space, i.e., an empty storage capacity available for recording, of the HDD 106 is checked by, e.g., the CPU 105 of the portable recording and playback unit 70. Then, the free space of the HDD 106 is compared with the file size of the compressed music data, which has been checked in step S42 and for which movement has been instructed, by, e.g., the CPU 8 of the music server 50. In accordance with a comparison result in step S42, it is determined whether the compressed music data, for which movement has been instructed, can be recorded in the HDD 106. If the recording in the HDD 106 is possible, the process goes to step S45 where transfer of the compressed music data, for which movement from the server 50 to the unit 70 has been instructed, is started.

On the other hand, if it is determined in step S43 that the free space of the HDD 106 in the portable recording and playback unit 70 is insufficient, the process goes to step S44. In step S44, the compressed music data already recorded in the HDD 106 is deleted automatically or through a predetermined procedure or method (described later) by the CPU 105 of the unit 70 so that the compressed music data, for which movement has been instructed, may be recorded in the HDD 106. Thereafter, the process goes to step S45.

Deletion of the compressed music data in step S44 can be automatically performed under control of the CPU 105 in accordance with a predetermined parameter for the compressed music data already recorded in the HDD 106. One example of a possible technique is to count the number of times of playback for each set of the compressed music data recorded in the HDD 106 of the portable recording and playback unit 70, and to delete the compressed music data in the order of the increasing number of times of playback from the HDD 106, starting from the minimum one. As an alternative, the compressed music data recorded in the HDD 106 may be deleted in accordance with the date, at which the data was recorded in the HDD 106, from the oldest one.

When the compressed music data is automatically deleted in step S44 from the HDD 106, there is a possibility that the compressed music data important for the user may be deleted from the HDD 106. To prevent such a trouble, warning display can be made on the display unit 53 of the music server 50 or the LCD 120 of the portable recording and playback unit 70 to, for example, indicate the fact that the unit 70 is in a state ready for operation to automatically delete the compressed music data from the HDD 106, or represent a list of the data to be deleted. The compressed music data is then deleted from the HDD 106 after confirmation by the user. Another conceivable method is to display a list of the compressed music data already recorded in the HDD 106 on the display unit 53 of the music server 50 or the LCD 120 of the portable recording and playback unit 70, and to prompt the user to select the compressed music data to be deleted.

When the HDD 106 comes into a state capable of recording a desired one of plural sets of the compressed music data recorded in the HDD 10, for which movement has been instructed, through the above-described processing in steps S43 and S44, transmission or transfer of the compressed music data from the music server 50 to the portable recording and playback unit 70 is started in step S45. Specifically, the compressed music data read out of the HDD 10 is supplied to the portable recording and playback unit 70 via the bus 40 and the interface 34. In the portable recording and playback unit 70, the compressed music data supplied via the interface 34 is recorded in the HDD 106 via the interface 35.

The compressed music data having been transferred to the portable recording and playback unit 70 still remains in the HDD 10 of the music server 50 as it is before the transmission to the unit 70. In this first embodiment, playback of the compressed music data that has been transferred to the unit 70, i.e., the compressed music data that has been moved to the unit 70 and still remains in the HDD 10, is prohibited on the side of the music server 50 (step S46). For example, at the time when the compressed music data has been transferred to the unit 70, a playback prohibit flag indicating prohibition of playback is set for the relevant compressed music data in the HDD 10. With the playback prohibit flag thus set, the CPU 8 of the music server 50 is prohibited from playing back the compressed music data that has been transferred to the unit 70. This means that the compressed music data stored in the HDD 10 has been virtually moved from the music server 50 to the portable recording and playback unit 70. Accordingly, the system is managed such that only one of the same plural sets of the compressed music data can be played back by the server 50 or the unit 70 at any time, whereby unauthorized copying of the compressed music data is prevented.

In next step S47, it is determined whether another set of the compressed music data is requested to be moved to the portable recording and playback unit 70. If movement of another set of the compressed music data is requested, the process returns to step S42. If movement of a further set of the compressed music data is requested no more, a series of the processes for moving the audio data is ended.

In the above description, one of plural sets of the compressed music data stored in the HDD 10 is transferred from the server 50 to the unit 70 in steps S42–S46 of the flowchart shown in FIG. 9. However, the present invention is not limited to such an example, and plural sets of the compressed music data may be moved together from the server 50 to the unit 70.

In the first embodiment described above, the compressed music data, which has been moved from the HDD 10 of the music server 50 at the movement source, is only prohibited from being reproduced, and the compressed music data still remains itself in the HDD 10. However, the present invention is not limited to the above-described embodiment, and the compressed music data having been moved may be deleted from the HDD 10, that is to say, the data may be itself erased.

The above first embodiment has been described in connection with the case of moving the compressed music data from the server 50 to the portable recording and playback unit 70. However, movement of the compressed music data in the opposite direction, i.e., movement of the compressed music data recorded in the HDD 106 of the portable recording and playback unit 70 to the HDD 10 of the music server 50, can also be executed in accordance with similar processing to that shown in the flowchart of FIG. 9.

In that case, when the compressed music data, which has been moved from the music server 50 to the portable recording and playback unit 70, is moved back from the unit 70 to the server 50, the playback prohibit flag having been set to one of plural sets of the compressed music data stored in the HDD 10, which has been moved back from the unit 70, is cleared in the server 50. Clearing of the playback prohibit flag allows the compressed music data existing in the music server 50 at the movement source to be played back again. On that occasion, the compressed music data, which has been stored in the HDD 106 of the unit 70 and transferred therefrom, is itself erased from the HDD 106. As an alternative, the management data for the compressed music data, which has been moved from a management table of the HDD 106, is deleted.

In the present invention, a database is externally provided to the music server 50 so that a search can be easily made with respect to the music data stored in the music server 50. More specifically, the music server 50 is connected to an external information apparatus, e.g., a personal computer, through predetermined interfaces, and a database, which is recorded on a recording medium such as a CD-ROM and provided to the user separately, is searched in the personal computer. The found information is then transferred to the music server 50.

By storing, in the music server 50, the transferred information in correlation to the music data stored in the HDD 10, the user can easily perform search and management of the music data recorded in the HDD 10 by using the stored information. Also, since only the necessary information is stored in the HDD 10, useless data is prevented from occupying the storage capacity of the HDD 10.

Figure 10:
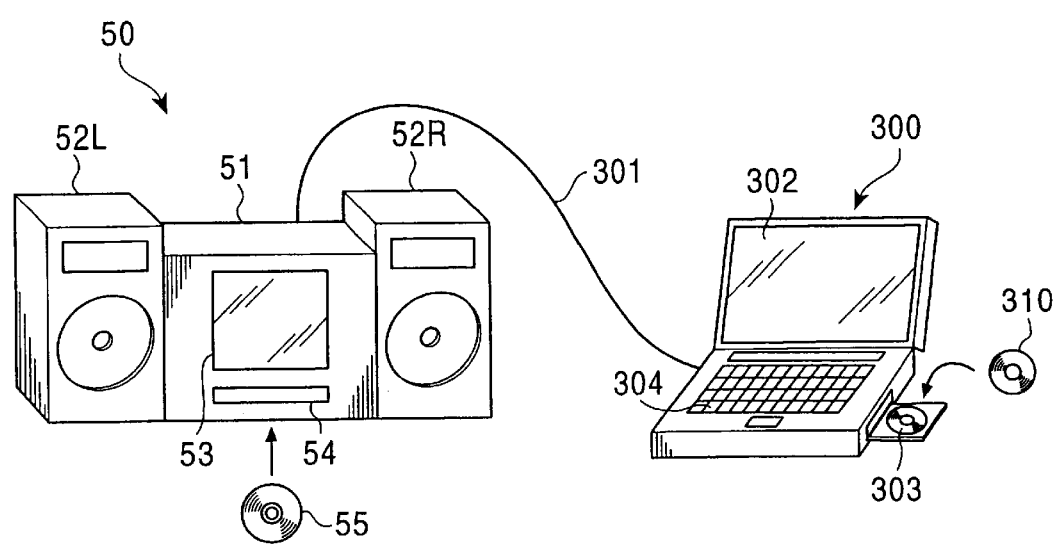
FIG. 10 is a diagram showing one example of construction of an information search system adaptable for a first embodiment of the present invention.

FIG. 10 shows one example of construction of an information search system adaptable for the first embodiment of the present invention. The music server 50 and a personal computer 300 are connected to each other through predetermined interfaces using a connecting line 301. The personal computer 300 comprises a display 302 in the form of an LCD, for example, a CD-ROM loader 303 for loading a CD-ROM 310 in place, a key input unit 304, etc. A pointing device such as a mouse may be connected as another input device to the personal computer 300. Though not shown, the personal computer 300 also includes an interface connection used for communication with the outside.

Figure 11:
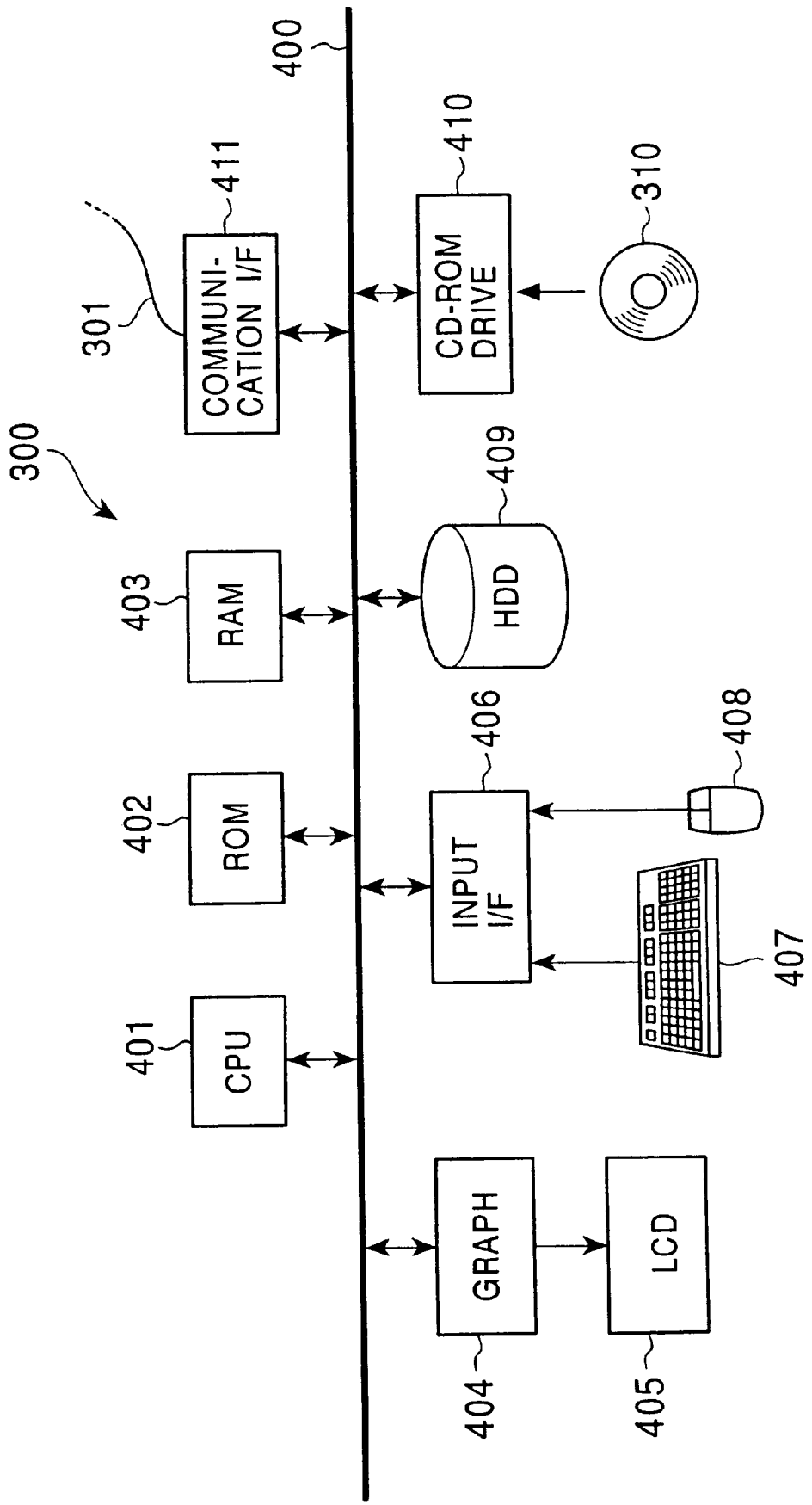
FIG. 11 is a block diagram showing one example of construction of a personal computer.

FIG. 11 shows one example of construction of the personal computer 300. The personal computer 300 has an ordinary construction and comprises a CPU 401, a ROM 402, a RAM 403, a graphic adapter 404, an input interface 406, an HDD 409, a CD-ROM drive 410, and a communication interface 411 which are connected to a bus 400. By inserting the CD-ROM 310 in the CD-ROM loader 303, the CD-ROM 310 is loaded in the CD-ROM drive 410 and the personal computer 300 comes into a state capable of reading information recorded on the CD-ROM 310.

Further, an LCD 405 corresponding to the display 302 is connected to the graphic adapter 404. In addition, the keyboard 407 and the mouse 408, for example, corresponding to the key input unit 304 are both connected as input devices to the input interface 406. The communication interface 411 may comprise an IEEE 1394, USB or IrDA interface or the like for communication with external equipment.

The interfaces used for connecting the personal computer 300 and the music server 50 are just required to be compatible between both sides of the personal computer 300 and the music server 50. For example, any of IEEE 1394, USB and IrDA interfaces can be used in the above arrangement. It is a matter of course that, when IrDA interfaces are used, the connecting line 301 can be dispensed with.

In the above arrangement, information regarding music data, i.e., additional information that is other than the music data to be played back as an audio signal but attendant on the music data, is recorded on the CD-ROM 310 in the form arranged into a database. For example, the name of player (singer) for the music data, the album name, the total number of music compositions, the time of each track, the title of each track, and the jacket image are recorded on the CD-ROM 310. Hereinafter, such additional information will be referred to as CD album information. A CD album information database resulted from processing the CD album information into the form of a database is recorded on the CD-ROM 310.

The CD album information may also include other various items of additional information than described above. For example, text information, such as explanation of the recorded album, and motion picture data can be recorded as the additional information.

The recording medium used for providing the CD album information database is not limited to a CD-ROM. The CD album information database may be provided in the form of a DVD-ROM (Digital Versatile Disk-Read Only Memory) or a semiconductor memory.

When the music data on the CD 55 is recorded in the HDD 10 of the music server 50 at a high speed or an equi-speed, the TOC information of the CD 55 is sent to the personal computer 300. Based on the sent TOC information, the personal computer 300 searches the CD album information database recorded on the CD-ROM 310 for the CD album information corresponding to the CD 55 on which the music data is to be recorded. The found CD album information is transferred from the personal computer 300 to the music server 50 and recorded in the HDD 10 in correlation to the TOC information of the CD 55.

Each time the music data on the CD 55 is recorded in the HDD 10, the CD album information can be retrieved in the CD-ROM 310 and the retrieved CD album information can be recorded in the HDD 10. Also, for the music data played back from the CD 55 and recorded in the HDD 10, it is possible to retrieve the CD album information for all sets of the recorded music data and to record the retrieved CD album information in the HDD 10 together.

By constructing a database of the thus-obtained CD album information in the HDD 10, the user can easily perform search and management of the music data recorded in the HDD 10. Also, at the same time as when the music data recorded in the HDD 10 is played back, the corresponding CD album information can be displayed on the display unit 53. Further, when the music data is moved from the music server 50 to the portable recording and playback unit 70, the CD album information corresponding to the moved music data can also be displayed.

While the database of the CD album information is constructed in the HDD 10 of the music server 50 in the above description, the present invention is not limited to such an example. As another example, the database of the CD album information may be always held on the CD-ROM 310 only, and a database for correlating the music data recorded in the HDD 10 and the TOC information thereof to the database recorded on the CD-ROM 310 may be constructed in the personal computer 300. Based on the music data and the TOC information from the music server 50, the personal computer 300 searches the database therein and finds the required CD album information on the CD-ROM 310 in accordance with a search result.

The above CD album information search system will be described in more detail. In the music server 50, when the music data recorded on the CD 55 is recorded in the HDD 10, a TOC information table is created based on the TOC information read out of the CD 55 by extracting the total playing time, the total number of tracks, and the playing time of each track for each CD. FIG. 12 shows one example of the TOC information table. The TOC information table is recorded, for example, in the HDD 10.

In the music server 50, as described above, the music data played back from the CD 55 is subjected to the compression-coding and then recorded as a file in the HDD 10. A file management table shown in FIG. 13, by way of example, is created by correlating each file recording the music data therein to address information of the HDD 10. The music data recorded in the HDD 10 is managed using the file management table. This file management table and the above TOC information table are correlated to each other, thereby constructing a contents database. The file and the TOC information are correlated, for example, such that the music data in the second track (2 TR) of the CD number 1 corresponds to the file number 002.

On the other hand, the CD album information database recorded on the CD-ROM 310 is constructed in the form of a table, by way of example, shown in FIG. 14. In this table, the name of player (singer), the title of album, the number of total tracks, the time of each track, the title of each track, and the jacket image are written for each CD album. Regarding the jacket image, only the file name may be written in the table and jacket image data itself may be stored in a separate area on the CD-ROM 310.

Figure 15:
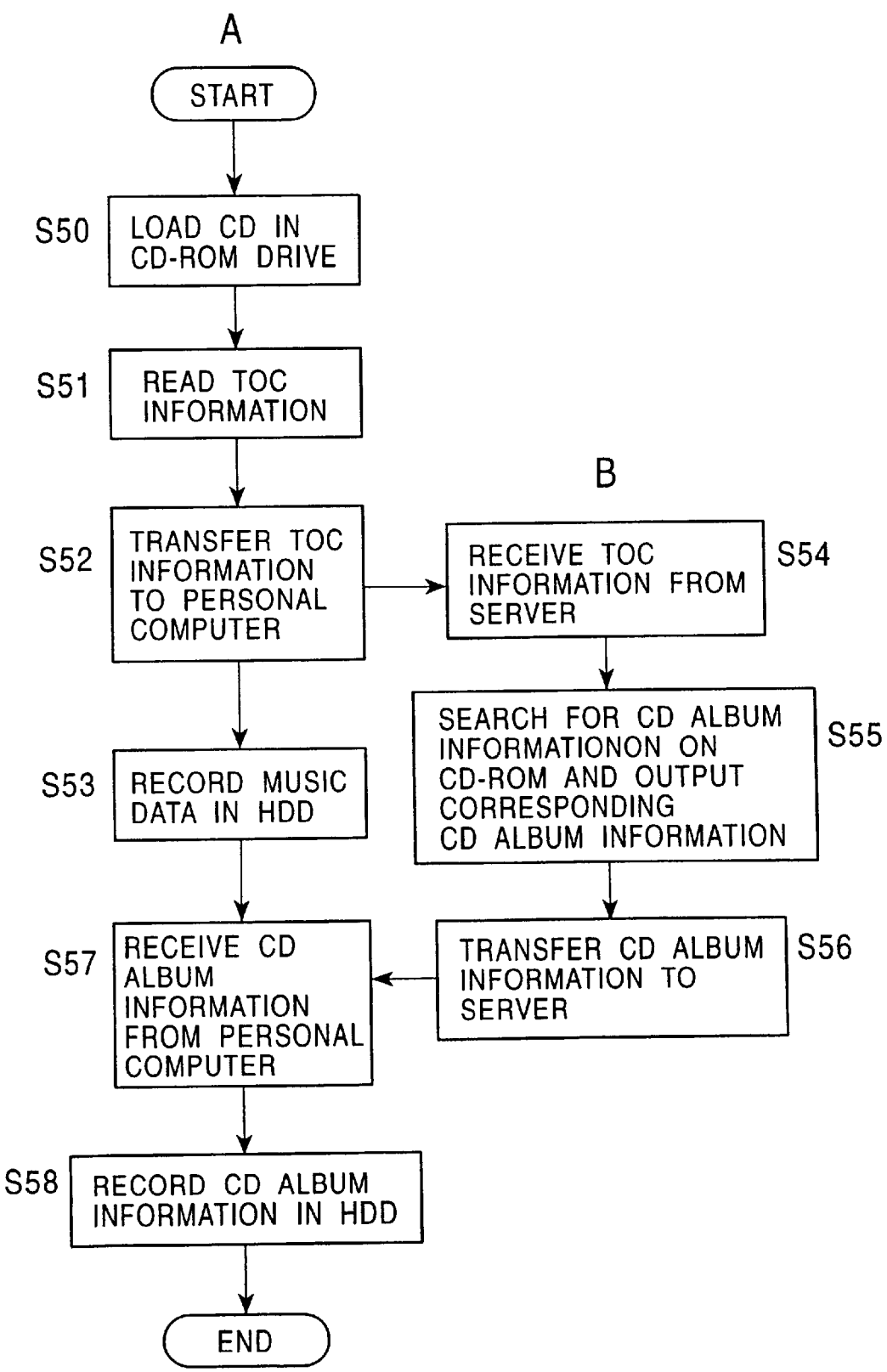
FIG. 15 is a flowchart showing one example of processing to record CD album information, which is recorded on a CD-ROM, in an HDD.

Processing to record the CD album information, which is recorded on the CD-ROM 310, in then HDD 10 will be described below with reference to a flowchart of FIG. 15. In FIG. 15, FIG. 15B represents processing executed on the side of the personal computer 300, and FIG. 15A represents processing executed on the side of the music server 50. The processing in the personal computer 300 is executed under control of the CPU 401 in accordance with a predetermined program. Similarly, the processing in the music server 50 is executed under control of the CPU 8 in accordance with a predetermined program.

It is assumed that the CD-ROM 310 is loaded in the CD-ROM drive 410 of the personal computer 300 beforehand. It is also assumed that the communication interface 411 of the personal computer 300 is conformed with IEEE 1394 and the music server 50 is connected to the personal computer 300 via the 1394 interface 28 and the connecting line 301 for bi-directional communication between the personal computer 300 and the music server 50.

First, in step S50 at A of FIG. 15, the CD 55 is loaded in the CD-ROM drive 9. Then, the CD-ROM drive 9 reads the TOC information out of the CD 55 (step S51). The read TOC information is recorded in the TOC information table and simultaneously transferred to the personal computer 300 via the 1394 interface 28 and the connecting line 301. If the TOC information table is not present in the HDD 10, it is newly created.

After the transfer of the TOC information, in next step S53, music data recorded on the CD 55 is played back by the CD-ROM drive 9 and recorded in the HDD 10 after being coded and compressed by the compression encoder 12. At this time, the file management table shown in FIG. 13 is updated upon recording of the compressed music data into the HDD 10. If the file management table is not present in the HDD 10, it is newly created.

In the personal computer 300, as shown at B in FIG. 15, the TOC information transferred from the music server 50 via the connecting line 301 is received by the communication interface 411 in step S54. In next step S55, the CD album information database recorded on the CD-ROM 310 is searched based on the received TOC information.

A description is now made of a manner of searching the CD album information database based on the received TOC information. As described above, the TOC information includes the total playing time, the total number of tracks, and the playing time of each track of the music data recorded on the CD 55. On the other hand, the CD album information includes the total number of music compositions (total number of tracks) and the time of each track of the music data recorded on the CD 55. Also, with the CD album information, the total playing time can be obtained from the total number of tracks and the playing time of each track.

In view of the above, the CD album information database is searched, for example, based on the total playing time and the total number of tracks of the TOC information, and the CD album information having the same data is extracted. If the hit CD album information is narrowed to one set in this stage, the fact is indicated on the display 302, for example, thereby prompting the user to make confirmation. If plural sets of the CD album information are extracted as candidates in this stage, the time information of each track of the TOC information is compared with the time information of each track of the CD album information for each candidate. Then, the CD album information having hit for all the tracks is extracted as a search result. Note that a search result may be extracted by comparing the time information of first three tracks, for example, rather than comparing the time information of all the tracks.

Returning to FIG. 15, if the search result shows that the CD album information corresponding to the TOC information transferred from the music server 50 is present in the CD album information database, the corresponding information is outputted. The outputted CD album information is transferred to the music server 50 via the communication interface 411 and the connecting line 301 (step S56). In the music server 50, the CD album information transferred from the personal computer 300 is received by the 1394 interface 28 in step S56. The received CD album information is recorded in the HDD 10.

The CD album information is preferably recorded on the HDD 10 in the form arranged into a database as with the CD album information database recorded on the CD-ROM 310. For example, when the CD album information is recorded in the HDD 10, a CD album information table such as shown in FIG. 14 is created. On that occasion, it is expedient to create an index file or the like with a particular item set as a key because such an index file is very useful when a search is made later using the CD album information recorded in the HDD 10.

Figures 16, 17:
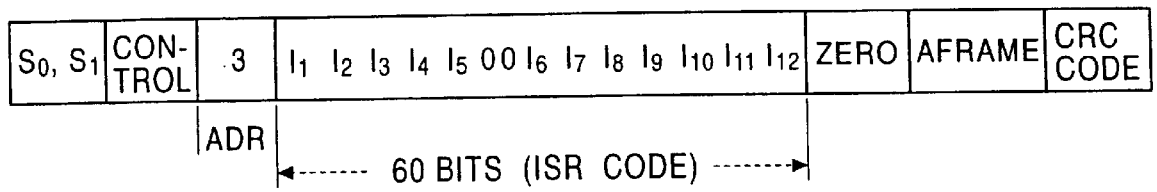
FIG. 16 is an illustration showing one example of configuration of a management database.
FIG. 17 is an illustration for explaining the ISRC.

After the recording of the CD album information in the HDD 10, a management database is created which includes the CD album information supplied from the CD-ROM 310 and the music data played back from the CD 55 and recorded in the HDD 10 in a correlated manner. FIG. 16 shows one example of configuration of the management database. In the management database, the CD album information and the file management table are managed in a correlated manner. The management database may also be used to manage the recording date/time of the music data and billing information in a linked manner. The management database is recorded, for example, in the HDD 10 of the music server 50.

A control application in the music server 50 manages the music data recorded on the HDD 10 using the management database. For example, necessary information is taken out from the CD album information and the music data is played back in accordance with the file management table.

The above description has been made of the processing executed in the music server 50 when the music data recorded on the CD 55 is recorded in the HDD 10. Even when the music data has been already stored in the HDD 10, it is likewise possible to search the CD album information database recorded on the CD-ROM 310 and to record the found CD album information in the HDD 10.

More specifically, when the music data is played back from the CD 55 and recorded in the HDD 10, the TOC information of the CD 55 is also read and recorded in the TOC information table in the HDD 10 as described above. Then, in step S54 of the flowchart shown in FIG. 15, a request for data of the TOC information table in the HDD 10 is issued from the personal computer 300 to the music server 50. In response to the request, the TOC information is read out of the HDD 10 in the music server 50, and the read TOC information is sent from the music server 50 to the personal computer 300.

The personal computer 300 receives the TOC information and searches, based on the received TOC information, the CD album information database recorded on the CD-ROM 310 (step S55). Then, the found CD album information is sent from the personal computer 300 to the music server 50 (step S56). When plural sets of the TOC information are sent from the music server 50, plural sets of the corresponding CD album information are retrieved and sent to the music server 50. The music server 50 receives the plural sets of the CD album information sent from the personal computer 300 and records them in the HDD 10.

The above-described management database may be created on the side of the personal computer 300. In other words, it is possible to create the management database in the HDD 409 of the personal computer 300. In this case, however, the personal computer 300 must be connected to the music server 50 when the user makes a search with respect to the music data recorded in the HDD 10. Further, as mentioned above, the CD album information database may be held on the CD-ROM 310 on the side of the personal computer 300 only.

In the music server 50, when the music data recorded in the HDD 10 is played back, for example, the CD album information corresponding to the played back music data can be retrieved by referring to the management database. The retrieved and read CD album information is displayed on the display unit 53. Where the display unit 53 is capable of displaying an image, a jacket image or the like can also be displayed on the display unit 53. Alternatively, a list of the CD album information recorded in the HDD 10 may be displayed on the display unit 53 so that the user may manage the music data recorded in the HDD 10 based on the displayed list.

Further, the music server 50 may be arranged such that a predetermined search word such as the title of music composition (song) and the name of player (singer) can be used to make a search with respect to the CD album information recorded in the HDD 10. The retrieved CD album information is displayed on the display unit 53. By using the management database, it is also possible to play back a file of the corresponding music data in accordance with a search result.

Next, a second embodiment of the present invention will be described below. In the above-described first embodiment, the CD album information corresponding to the CD 55 is obtained in the music server 50 using the TOC information of the CD 55. By contrast, in this second embodiment, the CD album information is identified using ISRC (International Standard Recorded Code) that is recorded in data Q within the data format of a music CD. Note that this second embodiment can be realized with the same construction as the first embodiment.

First, the ISRC will be described briefly. The ISRC is an international standard code regarding copyright, etc. of recording media on which audio and vide signals are recorded, and is employed in Europe (particularly in Germany). FIG. 17 shows a data array of Mode 3 of the data Q. A synchronizing pattern S0, S1 is arranged at the head, following which a control code and an address code each comprising 4 bits are arranged. The ISRC of 60 bits is arranged subsequent to the address code. ZERO, AFRAME, and CRC of 16 bits are arranged in this order subsequent to the ISRC.

The ISRC of 60 bits is made up of I1–I5 each comprising 6 bits and I6–I12 each comprising 4 bits. The I1 and I2 represent the country name and comprise two alphabets. I3, I4 and I5 are a combination of alphabets and numerals of 2 digits, and can identify 24480 owners individually. I6 and I7 each comprise a numeral and represent the year of recording. I8–I12 each comprise a numeral and represent the product number.

Thus, the ISRC enables music CDs having different titles to be identified individually. When utilizing the ISRC, a column of the ISRC is provided in the CD album information database recorded on the CD-ROM 310, and the ISRC corresponding to each set of the CD album information database is recorded in the column.

In the music server 50, when the music data recorded on the CD 55 is played back and recorded in the HDD 10, predetermined data among the music data recorded on the CD 55, e.g., Mode 3 of the data Q within the music data recorded as a first piece of music on the CD 55, is read to check whether the ISRC is recorded therein. If the ISRC is recorded, the ISRC is read and the read ISRC is sent to the personal computer 300.

Upon receiving the sent ISRC, the personal computer 300 checks the ISRC column of the CD album information database recorded on the CD-ROM 310. If the same ISRC as the received one exists in the database, the corresponding CD album information is read out of the CD-ROM 310 and sent from the personal computer 300 to the music server 50.

Thus, by utilizing the ISRC, the target CD album information can be surely obtained with one checking process. Where the ISRC is not recorded on the CD 55, the target CD album information can be obtained by making a narrowing search based on the TOC information as with the first embodiment.

According to the present invention, as described above, additional information of a CD album is provided in the form of a CD-ROM, and the additional information of the CD album corresponding to music data to be recorded in a recording medium of a music server is read out of the CD-ROM. In a recording system such as a music server for recording a large amount of music data of CDs, therefore, information for search and management of the recorded music data can be inputted without requiring the user to perform troublesome manipulation. As a result, convenience in use of the recording system is remarkably improved.

Further, according to the present invention, since the CD album information is recorded in a CD-ROM and the CD-ROM is provided to the user, supply and update of the CD album information can be realized in a very cost-effective way.

What is claimed is:

1. A recording apparatus for recording information onto a storage medium comprising:
    first reading-out means for reading-out data and identification information related to said data stored in a first storage medium;
    second reading-out means for reading-out additional information selected based on said identification information, wherein said additional information is stored in a second storage medium;
    storage means for storing said data read-out from said first storage medium and relation information relating said additional information to said data; and
    retrieval means for retrieving said data based on said additional information.

2. The recording apparatus according to claim 1, wherein said storage means stores said data read-out from said first storage medium and said additional information.

3. The recording apparatus according to claim 1, wherein said storage means stores said data read-out from said first storage medium and a table including said relation information relating said additional information to said data.

4. The recording apparatus according to claim 3, wherein said table includes said identification information related to said data and identification data of said additional information.

5. The recording apparatus according to claim 4, wherein said table includes a first address pointer of said data and a first address pointer of said additional information.

6. The recording apparatus according to claim 1, wherein said first reading-out means reads-out TOC information as said identification information from said first storage medium.

7. The recording apparatus according to claim 1, wherein said first reading-out means reads an ISRC as said identification information from said first storage medium.

8. The recording apparatus according to claim 1, further comprising compression means for compressing said data read-out from said first storage medium,
    wherein said storage means stores said additional information and said compressed data compressed by said compression means.

9. The recording apparatus according to claim 1, wherein said second reading-out means comprises a further retrieval means, said further retrieval means retrieves said additional information according to said identification information from said second storage.

10. The recording apparatus according to claim 1, further comprising reproducing means for reproducing said data stored in said first storage means.

11. The recording apparatus according to claim 10, wherein said reproducing means reproduces said data retrieved by said retrieval means.

12. The recording apparatus according to claim 1, further comprising further reproducing means for reproducing said additional information stored in said second storage medium.

13. The recording apparatus according to claim 12, further comprising display means for displaying said additional information reproduced by said further reproducing means.

14. The recording apparatus according to claim 1, wherein said storage means comprises a magnetic disc.

15. The recording apparatus according to claim 1, wherein said first storage medium comprises an optical disc and said first reading-out means reads-out said data stored in said optical disc.

16. The recording apparatus according to claim 1, wherein said first reading-out means reads-out audio data from said first storage medium.

17. The recording apparatus according to claim 16, wherein said first reading-out means reads-out music information from said first storage medium.

18. The recording apparatus according to claim 1, wherein said first storage medium comprises an optical disc and said second reading-out means reads-out said additional information stored in said optical disc.

19. The recording apparatus according to claim 1, wherein said first storage medium comprises a semiconductor memory and said second reading-out means reads-out said additional information stored in said semiconductor memory.

20. A transmitting and receiving apparatus comprising:
    first reading-out means for reading-out data and identification information related to said data stored in a first storage medium;
    transmitting means for transmitting said identification information;
    receiving means for receiving additional information selected based on said identification information stored in a second storage medium, said additional information corresponding to said identification information transmitted by said transmitting means;
    storage means for storing said data read-out from said first storage medium and relation information relating said additional information to said data; and
    retrieval means for retrieving said data based on said additional information.

21. A transmitting and receiving apparatus comprising:
    receiving means for receiving identification information of data stored in a first storage medium;

reading-out means for reading-out additional information selected based on said identification information stored in a second storage medium;

transmitting means for transmitting said additional information read-out by said reading-out means; and storage means for storing relation information, wherein said relation information relates said additional information to said data stored in said first storage medium.

22. A method for recording data to a storage medium, comprising the steps of:

reading-out data and identification information related to said data stored in a first storage medium;

reading-out additional information selected based on said identification information, wherein said additional information is stored in a second storage medium;

relating said additional information to said data read-out from said first storage medium; and retrieving said data based on said additional information.

23. A method for transmitting and receiving data, comprising the steps of:

reading-out data and identification information related to said data stored in a first storage medium;

transmitting said identification information;

receiving additional information selected based on said identification information stored in a second storage medium, said additional information corresponding to said transmitted identification information;

relating said additional information to said data read-out from said first storage medium; and retrieving said data based on said additional information.

24. A method for transmitting and receiving data comprising the steps of:

receiving identification information of said data stored in a first storage medium;

reading-out additional information selected based on said identification information stored in a second storage medium;

transmitting said read-out additional information; and storing relation information relating said additional information to said data stored in said first storage medium.

* * * * *